United States Patent
Fujii

(10) Patent No.: US 10,118,227 B2
(45) Date of Patent: Nov. 6, 2018

(54) MACHINE TOOL AND WORKPIECE FLATTENING METHOD

(71) Applicant: FANUC CORPORATION, Yamanashi (JP)

(72) Inventor: Takaaki Fujii, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/704,021

(22) Filed: Sep. 14, 2017

(65) Prior Publication Data
US 2018/0079009 A1   Mar. 22, 2018

(30) Foreign Application Priority Data

Sep. 16, 2016  (JP) ................................. 2016-182112

(51) Int. Cl.
*B24B 37/00* (2012.01)
*B23B 3/26* (2006.01)
*B23B 25/06* (2006.01)

(52) U.S. Cl.
CPC ................ *B23B 3/26* (2013.01); *B23B 25/06* (2013.01)

(58) Field of Classification Search
CPC .. B23B 3/22; B23B 3/26; B23B 25/06; B24B 37/005; B24B 37/04; B24B 37/00
See application file for complete search history.

(56) References Cited

U.S. PATENT DOCUMENTS

| 6,336,842 | B1* | 1/2002 | Ootsuki | B24B 49/16 451/177 |
|---|---|---|---|---|
| 6,602,110 | B2* | 8/2003 | Yi | B24B 37/005 451/5 |
| 9,943,943 | B2* | 4/2018 | Shinozaki | B24B 37/005 |
| 2002/0014139 | A1* | 2/2002 | Hirose | B23B 3/168 82/118 |
| 2005/0186887 | A1* | 8/2005 | Nomura | B24B 1/00 451/5 |
| 2009/0226272 | A1* | 9/2009 | Smith | B21D 22/18 409/80 |
| 2012/0094577 | A1* | 4/2012 | Gourraud | B24B 13/0012 451/5 |
| 2012/0253506 | A1* | 10/2012 | Matsushita | B23Q 1/5406 700/193 |
| 2012/0308781 | A1* | 12/2012 | Abe | B22F 3/105 428/189 |

(Continued)

FOREIGN PATENT DOCUMENTS

JP    9-108972 A    4/1997
JP    2008-264883 A    11/2008

*Primary Examiner* — Will Fridie, Jr.
(74) *Attorney, Agent, or Firm* — Hauptman Ham, LLP

(57) ABSTRACT

A machine tool includes one tip arranged on the spindle at a position that faces the table, a cutting edge position storing unit that stores therein multiple measured values that are obtained by performing measurement of the position of the tip at least two times in a state where the spindle is set at at least one phase and the tip is positioned at an identical point, a spindle tilt angle calculating unit that calculates a tilt angle of the spindle with respect to an XY-plane, based on the multiple measured values, and a coordinate system rotation unit that rotates the XY-plane about at least one of X-axis and Y-axis, based on the tilt angle of the spindle calculated by the spindle tilt angle calculating unit.

15 Claims, 28 Drawing Sheets

(56) References Cited

U.S. PATENT DOCUMENTS

| | | | |
|---|---|---|---|
| 2013/0336737 A1* | 12/2013 | Fujita | B23B 41/00 408/87 |
| 2016/0263685 A1* | 9/2016 | Hodza | B23D 77/02 |
| 2017/0190018 A1* | 7/2017 | Shibuya | B24B 53/08 |
| 2018/0111246 A1* | 4/2018 | Gratrix | B24B 37/005 |

* cited by examiner

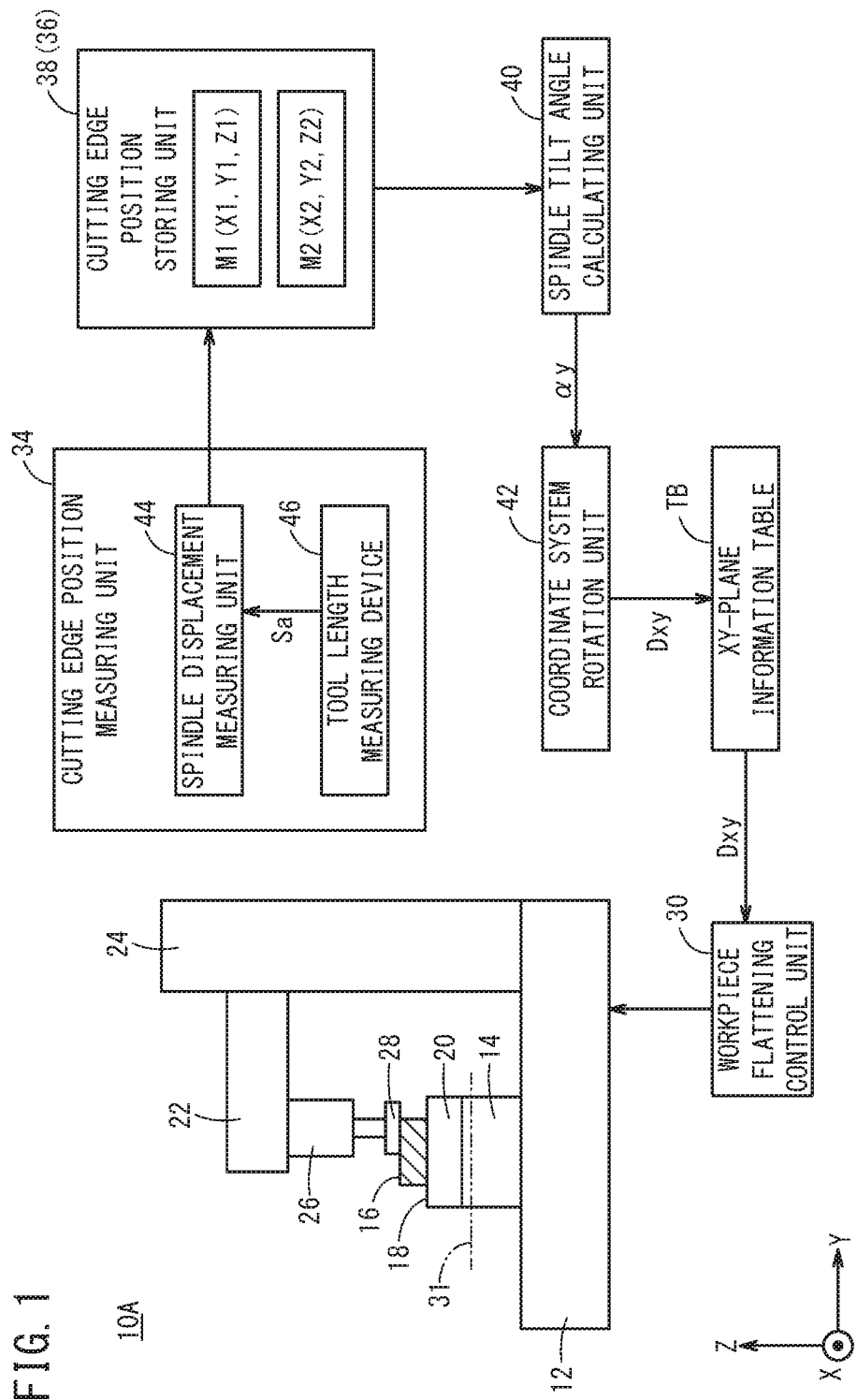

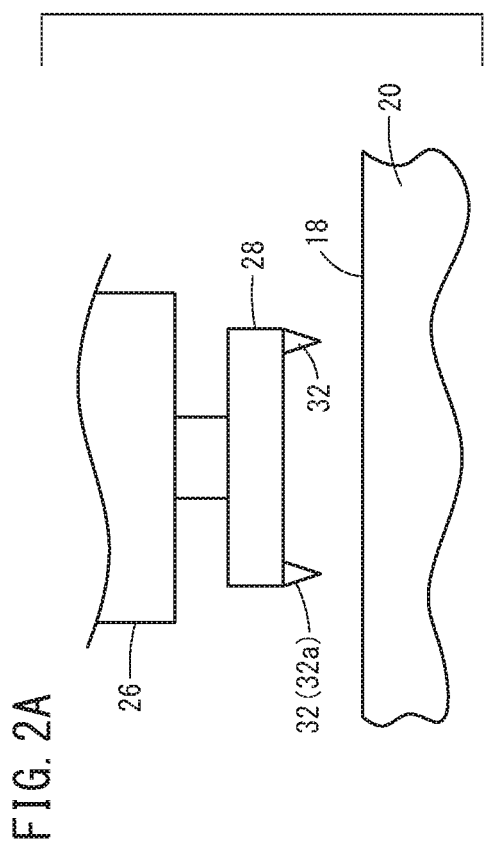
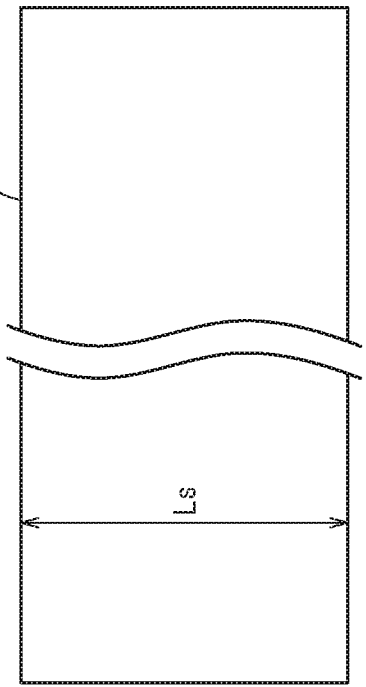
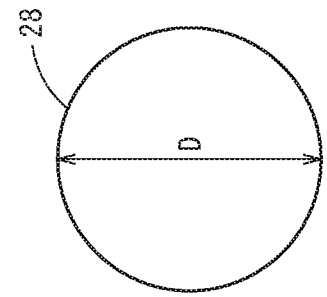

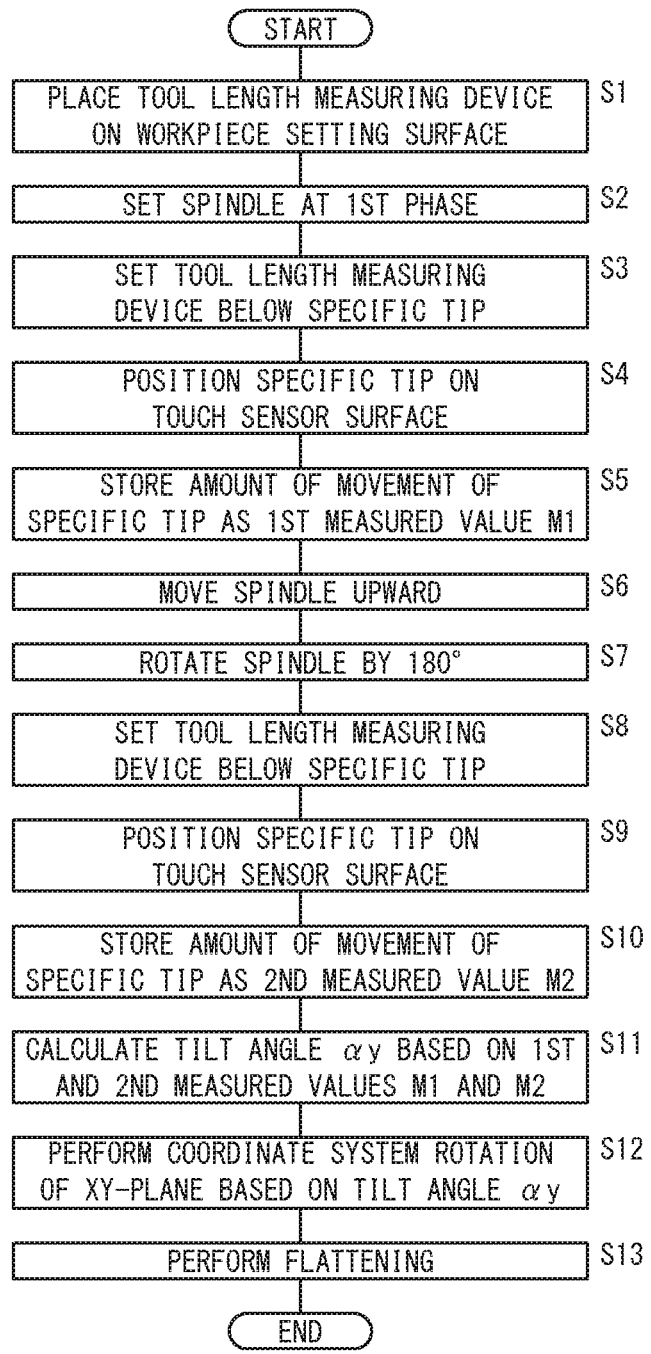

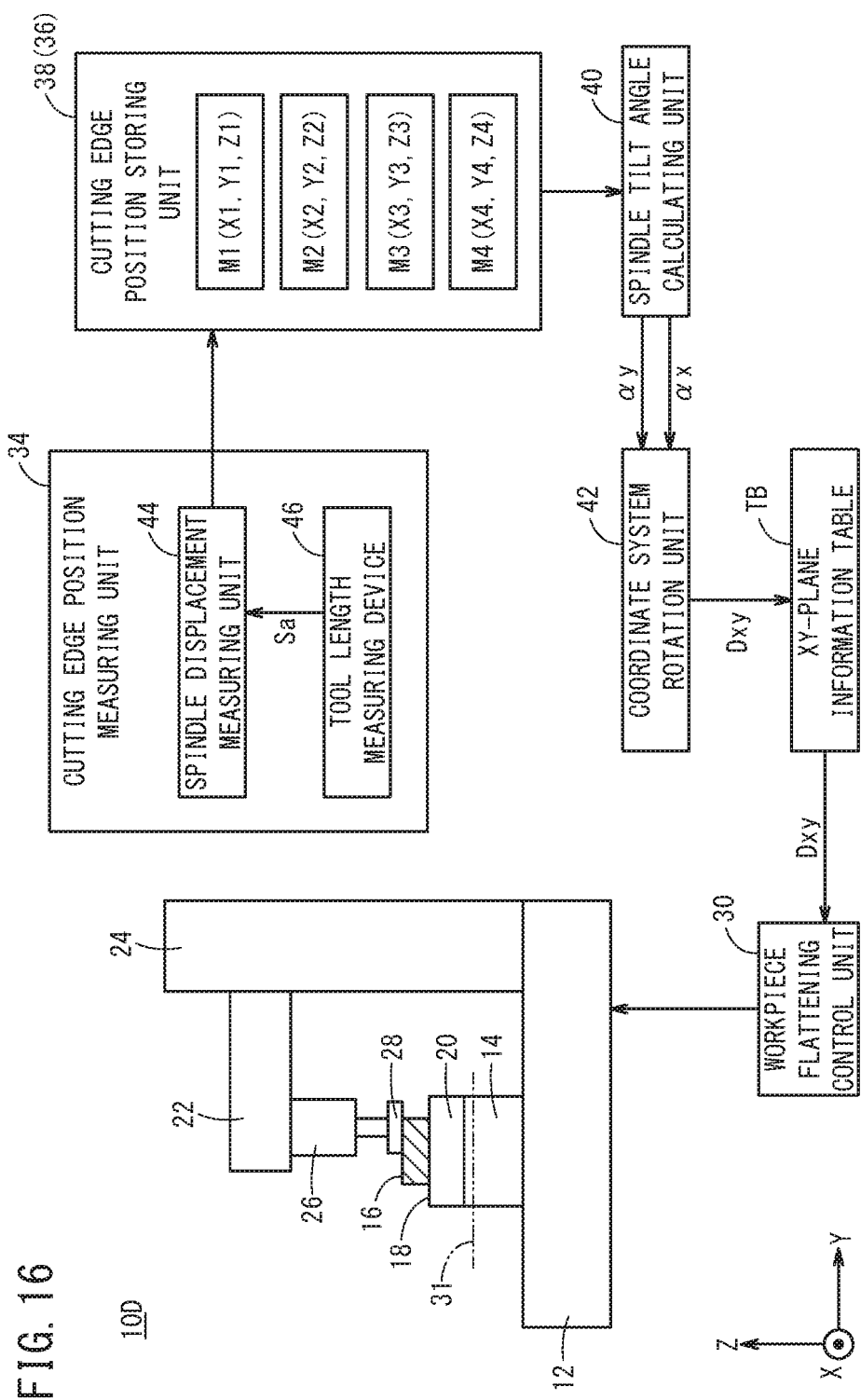

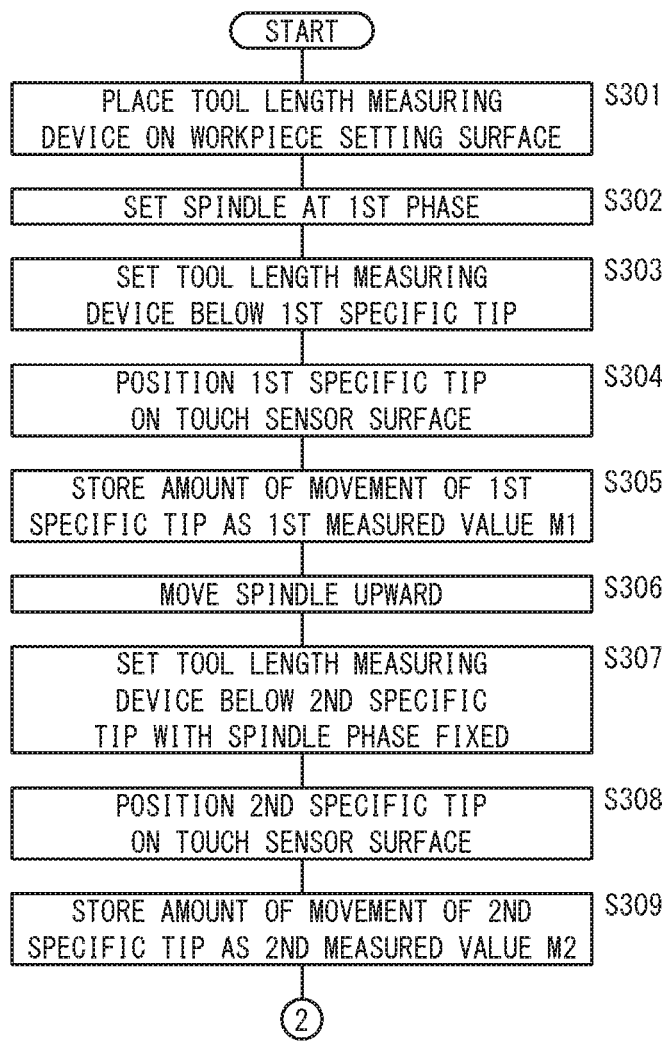

FIG. 28 PRIOR ART
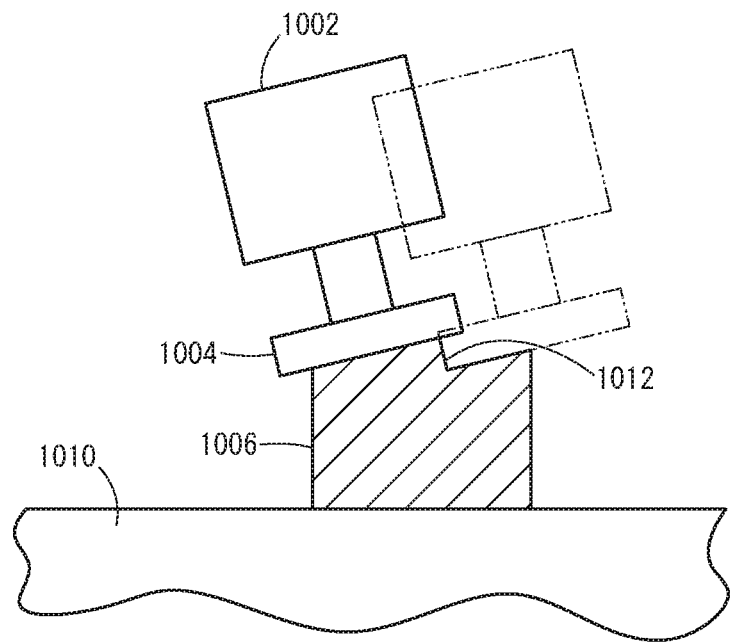
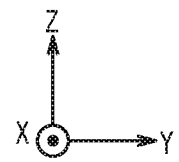

MACHINE TOOL AND WORKPIECE FLATTENING METHOD

CROSS-REFERENCE TO RELATED APPLICATION

This application is based upon and claims the benefit of priority from Japanese Patent Application No. 2016-182112 filed on Sep. 16, 2016, the contents of which are incorporated herein by reference.

BACKGROUND OF THE INVENTION

Field of the Invention

The present invention relates to a machine tool having a flattening unit and a workpiece flattening method.

Description of the Related Art

Recently, in machining a flat surface on a workpiece by using a machining center, a milling tool having a diameter greater than either of the dimension in the X-direction and the dimension in the Y-direction when viewed from the top surface of the workpiece is attached to the spindle of the machine tool and then the tool is moved in a single straight path, whereby it is possible to machine a flat surface with good flatness.

However, when the workpiece to be machined is large, the diameter of the milling tool must be increased, and hence the machine tool to be used tends to become large, which gives rise to a cost problem.

In order to solve this problem, there is a method of flattening with a small-diameter milling tool using a small machine tool. However, since the entire area of the top surface of the workpiece cannot be covered by a single machining path of a straight line, it is necessary to perform machining at least in two or more paths. In this case, unless the spindle attached to the machine tool is mounted so as to be perfectly orthogonal to the feed axes for performing drive in the X- and Y-axis directions, minute steps will be formed between two or more paths on the machined surface.

It is virtually impossible to assembly the machine in the manufacture stage such that the spindle is mounted perfectly orthogonal to the feed axes for driving in the X- and Y-axis directions without any mounting errors. Further, even if the spindle has been mounted with static precision as close to zero as possible, there is a risk of the mount angle of the spindle being tilted with respect to the feed axes for performing drive in the X- and Y-axis directions due to thermal displacement. For this reason, in forming a flat surface with a milling tool having a diameter smaller than the size of a workpiece, a level difference inevitably occurs on the machined surface.

According to Japanese Laid-Open Patent Publication No. 2008-264883, the following method is disclosed. That is, before starting machining, the spindle is rotated at the rotation speed for machining, and the position of the tool center and the thermal displacement of the spindle are determined, whereby the ratio of the tool center position to the thermal displacement is determined as a compensation coefficient. After the start of machining, using the obtained compensation coefficient, machining is performed while correcting the control amount of the cutting and moving device.

SUMMARY OF THE INVENTION

However, the method described in Japanese Laid-Open Patent Publication No. 2008-264883 is not aimed at making correction by considering the inclination of the spindle, but is to correct the position on the Z-axis relative to the program command value, and hence it is difficult to eliminate difference in level in machining a flat surface.

Referring now to FIGS. 27A to 28, description will be made on the factors that cause difference in level when flat surface machining is performed by using a small-diameter milling tool.

Description will be made concerning a case where flattening is performed on a workpiece 1006 by means of a milling tool 1004 gripped by a spindle 1002 of a machine tool 1000 configured as shown in FIG. 27A. As shown in FIGS. 27B and 27C, when the diameter D of the milling tool 1004 is smaller than a short-side dimension Ls of the workpiece 1006, at least two machining paths, or machining paths in which contact areas of the milling tool 1004 overlap each other are needed.

As the ideal of the machine tool 1000 having a configuration shown in FIG. 27A, the spindle 1002 needs to be mounted so as to be perfectly orthogonal to both the Y-axis for driving a saddle 1008 and the X-axis for driving a table 1010. However, at the manufacturing stage, it is very difficult or almost impossible to assemble these components without any static error, hence most of machine tools end up having slight errors.

As shown in FIG. 27A, in a case where the spindle 1002 is inclined with respect to the Y-axis, when the workpiece 1006 is milled in a straight line in the X-direction, a step 1012 occurs in the workpiece 1006 as shown in FIG. 28. The example shown in FIG. 28 is a mere example. Even with use of a milling tool 1004 having a greater size than the short-side dimension Ls of the workpiece 1006, if machining is performed by two or more machining paths or by machining paths in which the contact areas of the milling tool 1004 in the paths overlap each other, steps occur in the same manner as described above.

As means for avoiding occurrence of steps 1012 as shown in FIG. 28, it is necessary to assembly the spindle 1002 orthogonally to the feed direction of the Y-axis with high precision at the manufacturing stage. However, for example, if thermal displacement occurs in a column 1014 or a spindle head 1016 of the machine tool 1000 due to influence of the ambient temperature or the like at the mass production site, there occurs a problem that a slight amount of inclination arises relative to the direction of feed-axis motion even if the spindle 1002 is assembled with high precision.

The present invention has been devised in view of the above problem, and it is therefore an object of the present invention to provide a machine tool and a workpiece flattening method capable of suppressing occurrence of level differences on the workpiece surface as much as possible in flattening a large workpiece by using, for example, a general-purpose small-scale machine tool.

[1] A machine tool according to a first aspect of the present invention includes: a table having a workpiece setting surface to which a workpiece is fixed; a spindle equipped with a tool configured to perform flattening on the workpiece fixed to the table; a workpiece flattening control unit configured to perform flattening on the workpiece using the tool in such a manner that machining areas of the tool on a surface of the workpiece partially overlap one another; at least one contact element arranged on the spindle at a position that faces the table; a contact-element position storing unit configured to store multiple measured values that are obtained by performing measurement of a position of the contact element at least two times in a state where the spindle is set at at least one phase and the contact element is positioned at an identical point; a spindle tilt angle calculating unit configured to calculate a tilt angle of the spindle with respect to an XY-plane for flattening, based on the multiple measured values stored in the contact-element position storing unit; and a coordinate system rotation unit configured to rotate the XY-plane about at least one of the X-axis and the Y-axis, based on the tilt angle of the spindle calculated by the spindle tilt angle calculating unit, and the workpiece flattening control unit machines a flat surface of the workpiece along the XY-plane rotated by the coordinate system rotation unit.

With this configuration, it is possible to suppress occurrence of level differences on the workpiece surface as much as possible in flattening a large workpiece by using, for example, a general-purpose small-scale machine tool.

[2] In the first aspect, the contact-element position storing unit may be configured to store multiple measured values that are obtained by performing measurement on one of the contact elements in a state where the spindle is set at two or more different phases and the one contact element is positioned at an identical point.

With the above configuration, when, for example, a single contact element is positioned at an identical point with the spindle set at two different phases, it is possible to produce an orthogonal relationship between one direction (e.g., Y-direction) of the XY-plane and the spindle. As a result, it is possible to create a good flat surface on a workpiece almost free from level differences even if milling is performed multiple times on multiple paths along the other direction (e.g., X-direction).

Further, when a single contact element is positioned at an identical point with the spindle set at three different phases, it is possible to produce an orthogonal relationship between one direction (e.g., Y-direction) of the XY-plane and the spindle and between the other direction (X-direction) thereof and the spindle. As a result, it is possible to create a satisfactory flat surface on a workpiece almost free from level differences.

The reason why a single contact element is used is as follows. If multiple contact elements are used, in some cases the process of measuring the positions of contact elements may be affected by the mounting errors of the multiple contact elements. To deal with this, by use of a single contact element for measurement, the measurement is not influenced by the mounting error of the contact element, and thus it is possible to establish an orthogonal relationship between one direction of the XY-plane and the spindle with high precision.

[3] In the first aspect, the spindle may have the multiple contact elements arranged thereon, the contact-element position storing unit may be configured to store obtained multiple measured values that are obtained by measuring the position of each of the multiple contact elements in a state where the spindle is set at one phase and each of the multiple contact elements is positioned at an identical point, and the spindle tilt angle calculating unit may determine a tilt angle of the spindle with respect to at least one direction of the XY-plane, based on the multiple measured values.

This configuration makes it possible to produce an orthogonal relationship between one direction (e.g., Y-direction) of the XY-plane and the spindle, hence create a good flat surface on a workpiece almost without occurrence of level differences on the workpiece.

In particular, the tilt angle of the spindle with regard to the aforementioned one direction can be determined by positioning and measurement of the spindle at the first phase only. This makes it possible to reduce the number of steps and the work time for making one direction of the XY-plane and the spindle orthogonal to each other.

[4] The first aspect may be constructed such that the contact element is a tip arranged on the tool at a position that faces the table, and the contact-element position storing unit is configured to store multiple measured values that are obtained by performing measurement of the position of a cutting edge of the tip at least two times by use of a cutting edge position measuring unit fixed on the table, in a state where the cutting edge of the tip is positioned.

Use of the tip as the contact element can make a special measuring device unnecessary, which leads to reduction in cost. Further, since a tool to be actually used for machining the workpiece can be used, it is possible to perform positional measurement taking into account the dimensional tolerance of the tool. When a measuring device is used, it is usually necessary to finely correct the measurements taking into account the tolerance of the tool. However, according to the present invention, such fine correction is not needed, and thus the measurement work can be simplified.

[5] In the first aspect, it is preferable that a tool length measuring device configured to measure the length of the tool is used as the cutting edge position measuring unit. This makes it possible to measure the distance between the tip attached to the tool and the touch sensor surface of the tool length measuring device with high precision. Here, the tool length measuring device may be either of a contact type or non-contact type.

[6] In the first aspect, it is preferable that the contact element is a probe element of a touch probe mounted on the spindle at a position facing the table, and the probe element is deviated from the center axis of the spindle toward X-direction or Y-direction of the table. This makes it possible to secure an installation space on the table top, without the need to attach a special measuring device on the table side.

[7] In the first aspect, the machine tool may further include rotational axes configured to rotate the workpiece setting surface so as to make the XY-plane rotated by the coordinate system rotation unit and the workpiece setting surface parallel to each other.

Usually, when a workpiece is set on the top of the table, the table top forms a workpiece setting surface. In this case, the XY-plane and the workpiece setting surface of the table are not necessarily parallel to each other, possibly giving rise to a slight error. This slight error may be disadvantageously reflected on the workpiece after flat-surface machining on the workpiece. Stated otherwise, there may occur cases where the side face of the workpiece cannot be machined in a rectangular shape.

However, since this configuration of the present invention includes rotational axes that rotate the workpiece setting surface so as to make the XY-plane rotated by the coordinate system rotation unit and the workpiece setting surface parallel to each other, it is possible to make the XY-plane and the workpiece setting surface parallel to each other. As a result, when flattening is performed on the workpiece based on the XY plane after coordinate system rotation, it is possible to machine the side face of the workpiece in a rectangular shape, thus achieving improvement in machining quality.

[8] In the first aspect, the machine tool may further include a natural clamp jig configured to position the workpiece setting surface so as to make the XY-plane rotated by the coordinate system rotation unit and the workpiece setting surface parallel to each other. This configuration makes it possible to make the XY-plane and the workpiece setting surface parallel. Hence, when planar machining is performed on the workpiece based on the XY plane after coordinate system rotation, it is possible to perform machining while keeping the side face of the workpiece in a rectangular shape, thus achieving improvement in machining quality.

[9] In the first aspect, the diameter of the tool may be smaller than a shorter-side dimension of the workpiece.

With this configuration, when milling is performed multiple times on multiple machining paths, steps hardly occur on the workpiece even if the machining paths of the tool overlap, and hence it is possible to form a good flat surface on the workpiece. The machining paths of the tool may be not only linear but also arcuate.

[10] A workpiece flattening method according to a second aspect of the present invention is a workpiece flattening method for, in flattening a workpiece by use of: a table having a workpiece setting surface to which the workpiece is fixed; a spindle equipped with a tool configured to perform flattening on the workpiece fixed to the table; and the tool, performing machining in such a manner that machining areas of the tool on a surface of the workpiece partially overlap one another, including: a measured-value storing step of storing multiple measured values that are obtained by performing at least two times of measurement of a position of at least one contact element arranged on the spindle at a position that faces the table, in a state where the spindle is set at at least one phase and the contact element is positioned at an identical point; a spindle tilt angle calculating step of calculating a tilt angle of the spindle with respect to an XY-plane for flattening, based on the multiple measured values stored; and a coordinate system rotating step of rotating the XY-plane about at least one of X-axis and Y-axis, based on the tilt angle of the spindle calculated, wherein a flat surface of the workpiece is machined along the XY-plane rotated by the coordinate system rotating step.

[11] In the second aspect, in the measured-value storing step, multiple measured values may be stored that are obtained by performing measurement on one of the contact elements in a state where the spindle is set at two or more different phases and the one contact element is positioned at an identical point.

[12] The second aspect may be constructed such that the spindle has the multiple contact elements arranged thereon; in the measured-value storing step, multiple measured value are stored that are obtained by measuring the position of each of the multiple contact elements in a state where the spindle is set at one phase and each of the multiple contact elements is positioned at an identical point; and in the spindle tilt angle calculating step, a tilt angle of the spindle with respect to at least one direction of the XY-plane is determined, based on the multiple measured values.

[13] The second aspect may be constructed such that the contact element is a tip arranged on the tool at a position that faces the table; and in the measured-value storing step, multiple measured values are stored that are obtained by performing measurement of the position of a cutting edge of the tip at least two times by use of a cutting edge position measuring unit fixed on the table, in a state where the cutting edge of the tip is positioned.

[14] The second aspect may be constructed such that the contact element is a probe element of a touch probe mounted on the spindle at a position facing the table; and the probe element is deviated from the center axis of the spindle toward X-direction or Y-direction of the table.

[15] In the second aspect, the diameter of the tool may be smaller than a shorter-side dimension of the workpiece.

According to the tool machines and workpiece flattening method of the present invention, it is possible to suppress occurrence of level differences on the workpiece surface as much as possible in flattening a large workpiece by using, for example, a general-purpose small-scale machine tool.

The above and other objects features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 1 is a configuration diagram showing a machine tool (first machine tool) according to a first embodiment of the present invention;

FIG. 2A is an illustrative view showing an example of a tip of a milling tool positioned on a workpiece setting surface;

FIG. 2B is an outline drawing showing a milling tool as viewed from the top;

FIG. 2C is an outline drawing of a workpiece viewed from the top with its part omitted;

FIG. 4 is a flowchart showing the processing operation of the first machine tool;

FIG. 16 is a configuration diagram showing a machine tool (fourth machine tool) according to a fourth embodiment of the present invention;

FIG. 17 is a flowchart (part 1) showing a processing operation of the fourth machine tool;

DESCRIPTION OF THE PREFERRED EMBODIMENTS

Figure 3A:
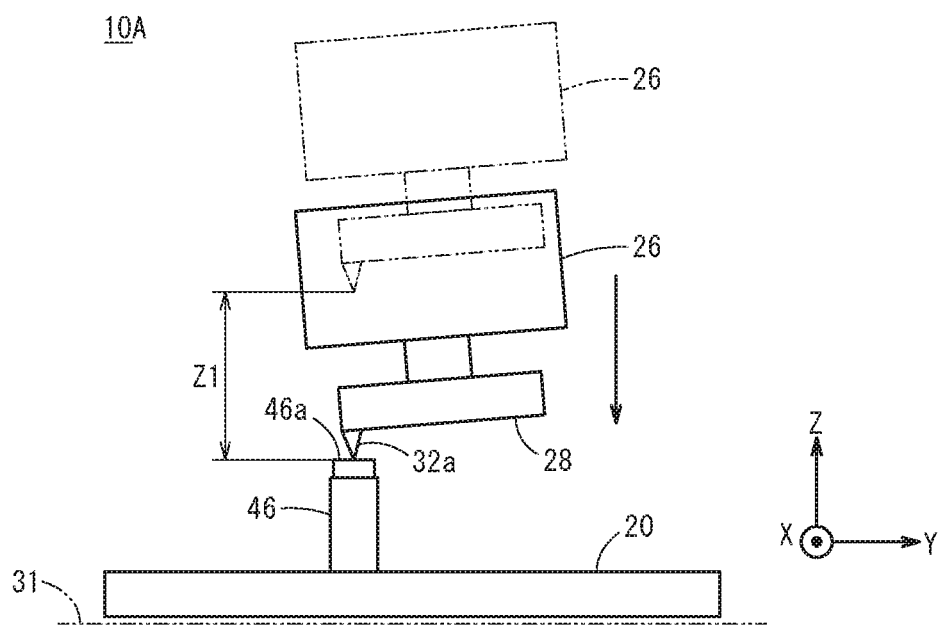
FIG. 3A is a view showing a state in which a specific tip is positioned on a touch sensor surface of a tool length measuring device placed on a workpiece setting surface, as viewed from the X-direction.

Now, preferred embodiments of machine tools and workpiece flattening methods according to the present invention will be described with reference to FIGS. 1 to 28. In this description, a numerical range including "to" is used to indicate a range that includes numerical values before and after "to" as the lower and upper limit values, respectively.

<First Machine Tool>

To begin with, a machine tool (hereinafter referred to as a first machine tool 10A) according to a first embodiment includes: a bed 12 as a base; a table 20 that is movably attached on the bed 12 via a saddle 14 and has a workpiece setting surface 18 with a workpiece 16 fixed thereon; a column 24 fixed on the bed 12 and configured to support a spindle head 22 in a vertically movably manner; a spindle 26 of the spindle head 22, arranged at a position facing the workpiece setting surface 18 of the table 20; a milling tool 28 attached to the spindle 26 and configured to flatten the workpiece 16; and a workpiece flattening control unit 30 that controls flattening of the workpiece 16 by use of the milling tool 28 in such a manner that milling areas (machining areas) of the milling tool 28 on the plane of the workpiece 16 partially overlap one another.

The table 20 moves over the saddle 14 in the X-direction by one unillustrated feed axis (X-axis), while the saddle 14 moves over the bed 12 in the Y-direction by another unillustrated feed axis (Y-axis). Movements of the table 20 and the saddle 14 are carried out automatically or manually by the workpiece flattening control unit 30. That is, the table 20 moves in the X-direction and the Y-direction along the XY-plane 31 defined by the X-axis and Y-axis along which the table 20 is driven.

The milling tool 28 is mounted to the spindle 26 at a position opposing the workpiece setting surface 18 of the table 20 and has multiple tips 32 protruding toward the workpiece setting surface 18 as shown in FIG. 2A. In FIG. 2A, two tips 32 mounted 180° opposite to each other are shown as a typical example, but in reality three or more tips 32 are arranged along the circumference of the milling tool 28, for example, equi-angularly. As shown in FIGS. 2B and 2C, the diameter D of the milling tool 28 is smaller than the short dimension Ls (shorter-side dimension) of the workpiece 16.

Further, as shown in FIG. 1, the first machine tool 10A includes a cutting edge position measuring unit 34, a cutting edge position storing unit 38 as a contact-element position storing unit 36, a spindle tilt angle calculating unit 40 and a coordinate system rotation unit 42.

The cutting edge position measuring unit 34 has a spindle displacement measuring unit 44 for measuring the displacement of the spindle 26 and a tool length measuring device 46 mounted and fixed on the workpiece setting surface 18.

Figure 3B:
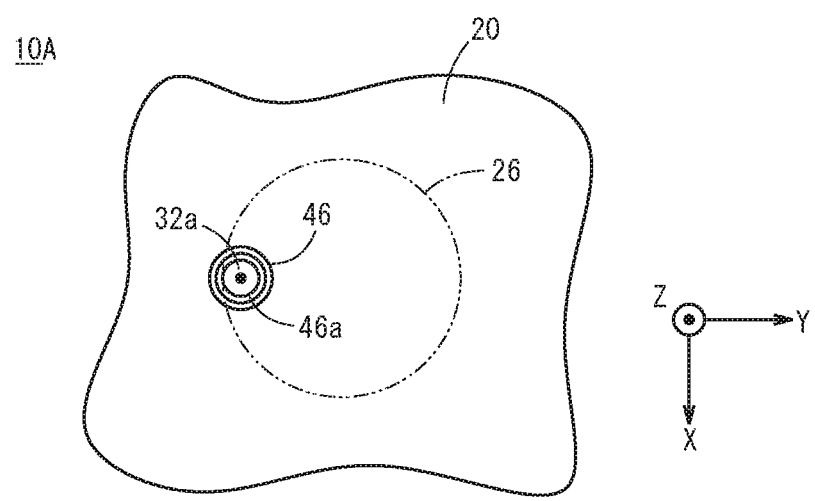
FIG. 3B is a view showing the state shown in FIG. 3A as viewed from the Z-direction, with its part omitted.

As shown in FIGS. 3A and 3B, the tool length measuring device 46 is set on the workpiece setting surface 18 of the table 20 with a touch sensor surface 46a facing up. As will be described later, when the spindle 26 is moved toward the tool length measuring device 46 so that the cutting edge of a specific tip 32 (hereinafter referred to as a specific tip 32a) as a contact element comes into contact with the touch sensor surface 46a, or the cutting edge of the specific tip 32a is positioned on the tool length measuring device 46, the tool length measuring device 46 outputs a detection signal Sa to the spindle displacement measuring unit 44.

The spindle displacement measuring unit 44 measures the amount of movement of the specific tip 32a from when the specific tip 32a is started to move, and based on the input of the detection signal Sa from the tool length measuring device 46, stores measured values inclusive of the amount of movement of the specific tip 32a in the cutting edge position storing unit 38.

More specifically, the cutting edge position storing unit 38 stores multiple measured values (a first measured value M1 and a second measured value M2) obtained by performing the process for positioning the cutting edge of the specific tip 32a twice using the cutting edge position measuring unit 34. Here, storing of the measured values including the amount of movement of the specific tip 32a in the cutting edge position storing unit 38 may be performed by an operator operating an entry button arranged on the control panel of the first machine tool 10A when the cutting edge of the specific tip 32a is positioned on the tool length measuring device 46.

The spindle tilt angle calculating unit 40 determines the tilt angle of the spindle 26 with respect to the XY-plane 31, in particular, a tilt angle αy with respect to the Y-direction, based on the multiple measured values stored in the cutting edge position storing unit 38.

The coordinate system rotation unit 42 rotates the XY-plane 31 about the X-axis by the tilt angle αy of the spindle 26 calculated by the spindle tilt angle calculating unit 40. More specifically, the coordinate system rotation unit 42 generates the rotated XY-plane 31 by driving the Z-axis simultaneously with driving the Y-axis such that the Y-axis is driven in a direction to cancel the calculated tilt angle αy. As a result, the Y-direction of the generated XY-plane 31 and the spindle 26 become orthogonal to each other.

Next, the processing operation of the first machine tool 10A will be described with reference to FIGS. 3A to 7. Here, it is assumed that the spindle 26 is located at the machine zero point in the initial state.

First, at step S1 of FIG. 4, as shown in FIG. 3A described above, the tool length measuring device 46 is placed on the workpiece setting surface 18 of the table 20 with the touch sensor surface 46a facing upward.

At step S2, as shown in FIG. 3B, the spindle 26 is set at a first phase at which one tip (hereinafter referred to as a specific tip 32a) of the multiple tips provided on the end face of the milling tool 28 is directed toward the Y-direction.

At step S3, as shown in FIG. 3B, the table 20 and the saddle 14 are moved such that the central portion of the touch sensor surface 46a of the tool length measuring device 46 is positioned below the specific tip 32a.

At step S4, as shown in FIG. 3A, the spindle 26 is moved downward to position the specific tip 32a at the central portion of the touch sensor surface 46a of the tool length measuring device 46.

At step S5, the spindle displacement measuring unit 44 stores the displacement of the specific tip 32a, i.e., the amount of movement of the specific tip 32a, as the first measured value M1 in the cutting edge position storing unit 38. At this time, the cutting edge position storing unit 38 may store the three-dimensional coordinates (X1, Y1, Z1) therein. In this case, when the mounted position of the tool length measuring device 46 is defined as the origin, X1=0 and Y1=0 because no displacement is made on the X coordinate or the Y coordinate. Z1 corresponds to the amount of movement of the specific tip 32a in the Z-direction.

At step S6, the spindle 26 is moved upward and returned to the machine zero point.

Figure 5A:
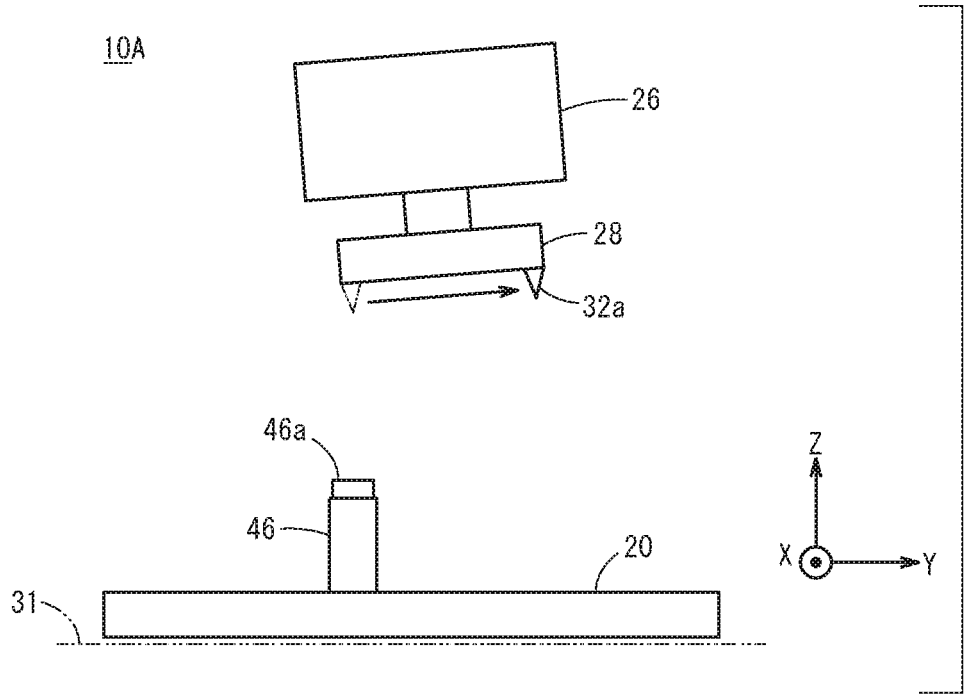
FIG. 5A is a view showing a state where the spindle is rotated by 180° after moving the spindle upward from the state of FIG. 3A, as viewed from the X-direction.
Figure 5B:
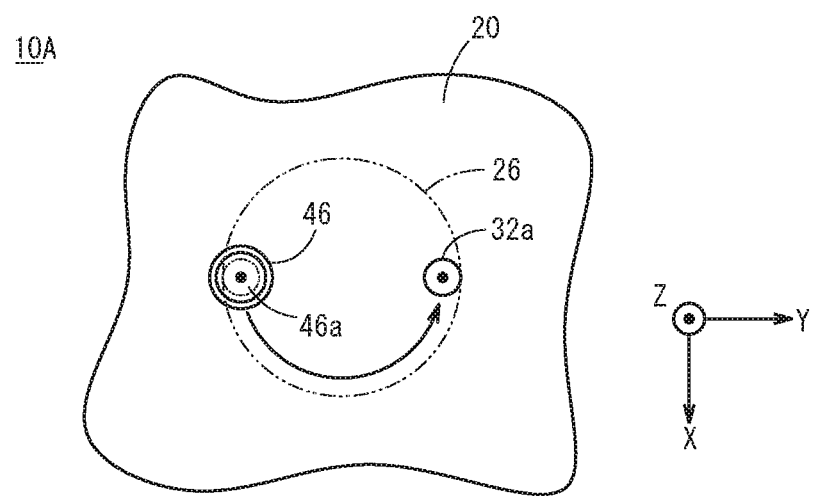
FIG. 5B is a plan view showing the state shown in FIG. 5A as viewed from the Z-direction, with its part omitted.

At step S7, as shown in FIGS. 5A and 5B, the spindle 26 is rotated by 180° from the first phase.

Figure 6A:
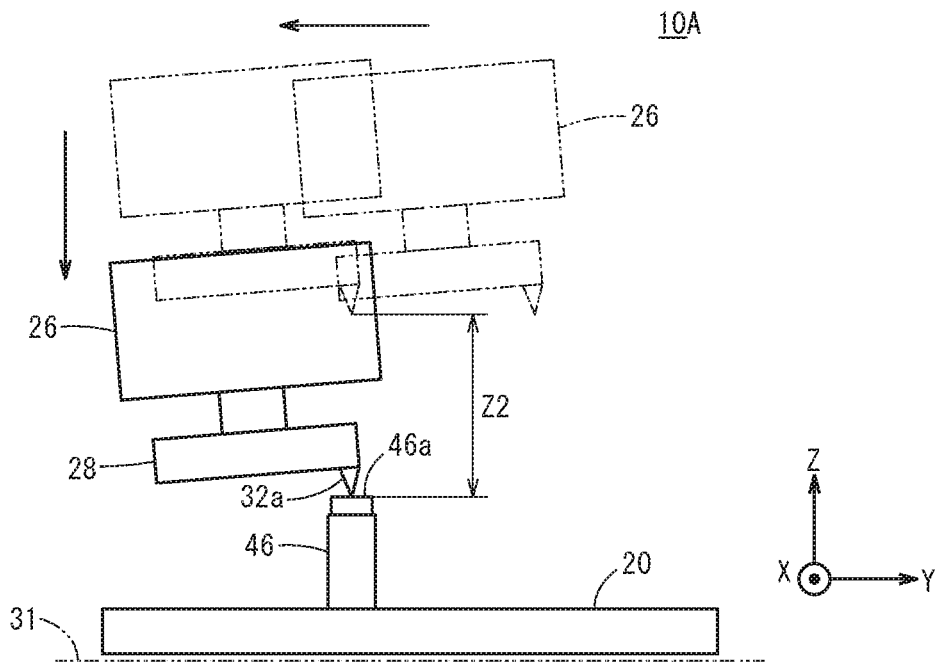
FIG. 6A is a view showing a state in which a specific tip is positioned on the touch sensor surface of the tool length measuring device from the state of FIG. 5A as viewed from the X-direction.
Figure 6B:
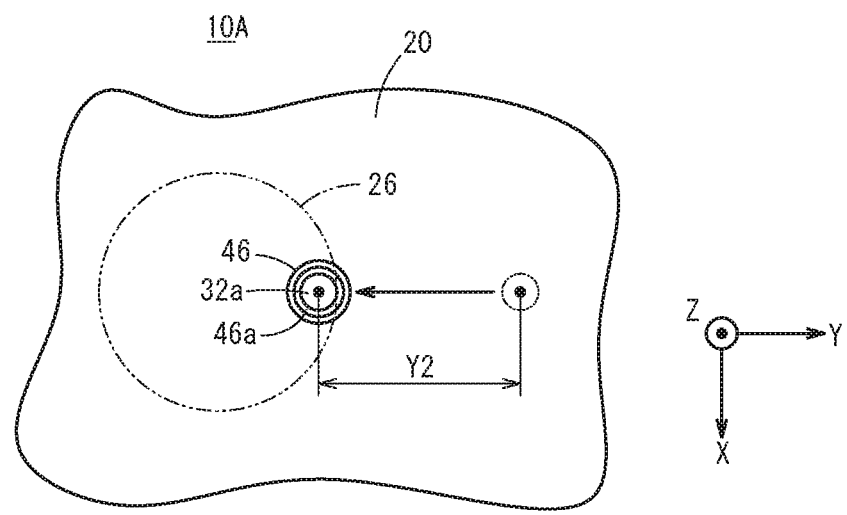
FIG. 6B is a view showing the state shown in FIG. 6A as viewed from the Z-direction, with its part omitted.

At step S8, in order to enable the specific tip 32a to be measured again by the tool length measuring device 46, that is, in order to position the central portion of the touch sensor surface 46a of the tool length measuring device 46 below the specific tip 32a, the table 20 and the saddle 14 are moved in the Y-direction as shown in FIGS. 6A and 6B.

At step S9, the spindle 26 is moved downward to position the specific tip 32a at the central portion of the touch sensor surface 46a of the tool length measuring device 46.

At step S10, the spindle displacement measuring unit 44 stores the displacement of the specific tip 32a, i.e., the amount of movement of the specific tip 32a, in the cutting edge position storing unit 38 as the second measured value M2. At this time, the cutting edge position storing unit 38 may store the three-dimensional coordinates (X2, Y2, Z2) therein. In this case, when the mounted position of the tool length measuring device 46 is defined as the origin, since no displacement is made on the X coordinate, X2=0. Y2 corresponds to the displacement in the Y-direction on the XY-plane 31, and Z2 corresponds to the displacement of the spindle 26 in the Z-direction.

At step S11, the spindle tilt angle calculating unit 40 calculates the tilt angle of the spindle 26 with respect to the XY-plane 31 based on the first measured value M1 and the second measured value M2 stored in the cutting edge position storing unit 38. In the above example, since the X coordinates are the same, trigonometric functions are used to calculate the tilt angle αy of the spindle 26 with respect to Y-axis from the stored Y coordinates and Z coordinates of the first and second measured values M1 and M2.

At step S12, the coordinate system rotation unit 42 rotates the XY-plane 31 about the X-axis by the tilt angle αy of the spindle 26 calculated by the spindle tilt angle calculating unit 40. More specifically, the coordinate system rotation unit 42 drives the Z-axis simultaneously with driving the Y-axis such that the Y-axis is driven in a direction to cancel the calculated tilt angle αy. As a result, the Y-direction of the XY-plane 31 and the spindle 26 become orthogonal to each other. Coordinate information Dxy of the rotated XY-plane 31 is stored in an XY-plane information table TB.

At step S13, the workpiece flattening control unit 30 reads out the coordinate information Dxy of the XY-plane 31 from the XY-plane information table TB, and carries out flattening machining on the workpiece 16 fixed on the workpiece setting surface 18 along the XY-plane 31 generated by coordinate system rotation by the coordinate system rotation unit 42. Hereinafter, the same applies to the following embodiments.

Figure 7:
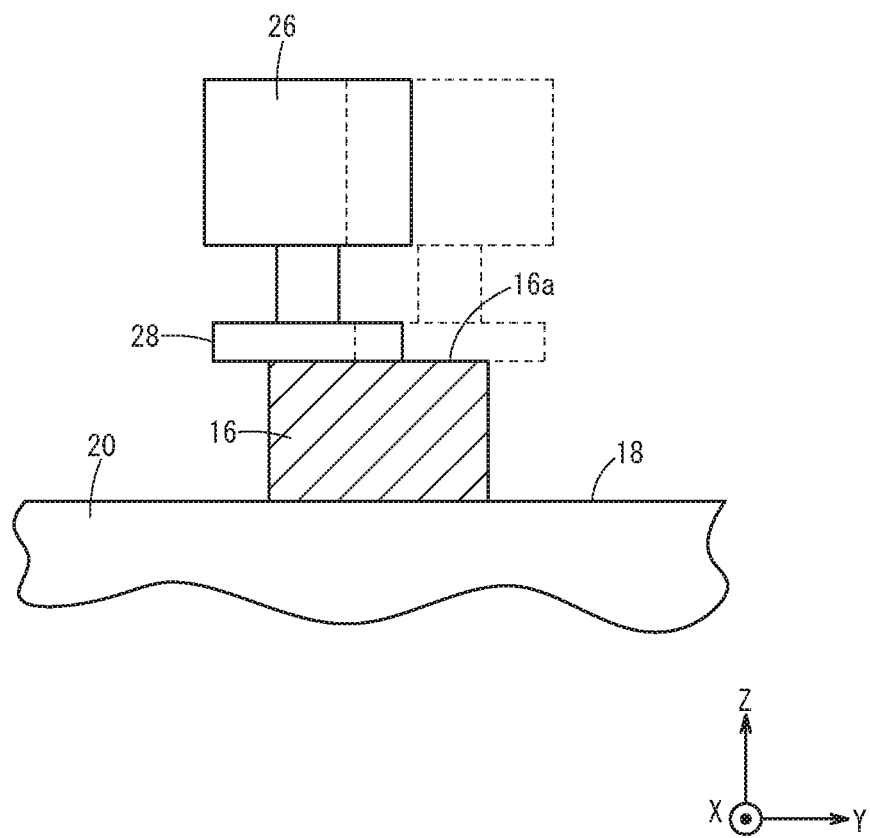
FIG. 7 is an illustrative view showing flattening by the first machine tool.

Since the diameter D of the milling tool 28 is smaller than the short dimension Ls of the workpiece 16, when flattening the workpiece, it is necessary to perform milling multiple times on multiple paths. In the present embodiment, since the Y-direction of the XY-plane 31 and the spindle 26 are arranged orthogonally to each other, even if milling is performed multiple times in the X-axis direction on the multiple machining paths of the milling tool 28 that overlap each other, a level difference hardly occurs on the workpiece 16 as shown in FIG. 7 so that a good flat surface can be formed on the workpiece 16. That is, the flatness of the machined surface of the workpiece 16 can be improved. The above effects can be obtained not only in the case of straight machining paths of the milling tool 28, but also in the case of arcuate machining paths thereof.

The reason why the phase of the spindle 26 is rotated by 180° in the first machine tool 10A is as follows. If multiple tips 32a are used as the specific tips, there occur cases where the multiple tips cannot be located at positions 180° apart from one another due to mounting errors of the tips 32a. To deal with this, by use of a single specific tip 32a for measurement, the measurement is prevented from being influenced by the mounting errors of the multiple tips 32a, and thus it is possible to establish an orthogonal relationship between the Y-direction of the XY-plane 31 and the spindle 26 with high precision. Here, in the above example, the contact type tool length measuring device 46 is used, and however, a non-contact type tool length measuring device, sensor, etc. may be used if there is no interference. This also applies to various embodiments described hereinbelow.

<Second Machine Tool>

Next, a machine tool according to a second embodiment (hereinafter referred to as a second machine tool 10B) will be described with reference to FIGS. 8 to 11C.

The second machine tool 10B has substantially the same configuration as that of the above-described first machine tool 10A, except that the X-direction of the XY-plane 31 is made orthogonal to the spindle 26 and the Y-direction of the XY-plane 31 is also made orthogonal to the spindle 26.

Figure 8:
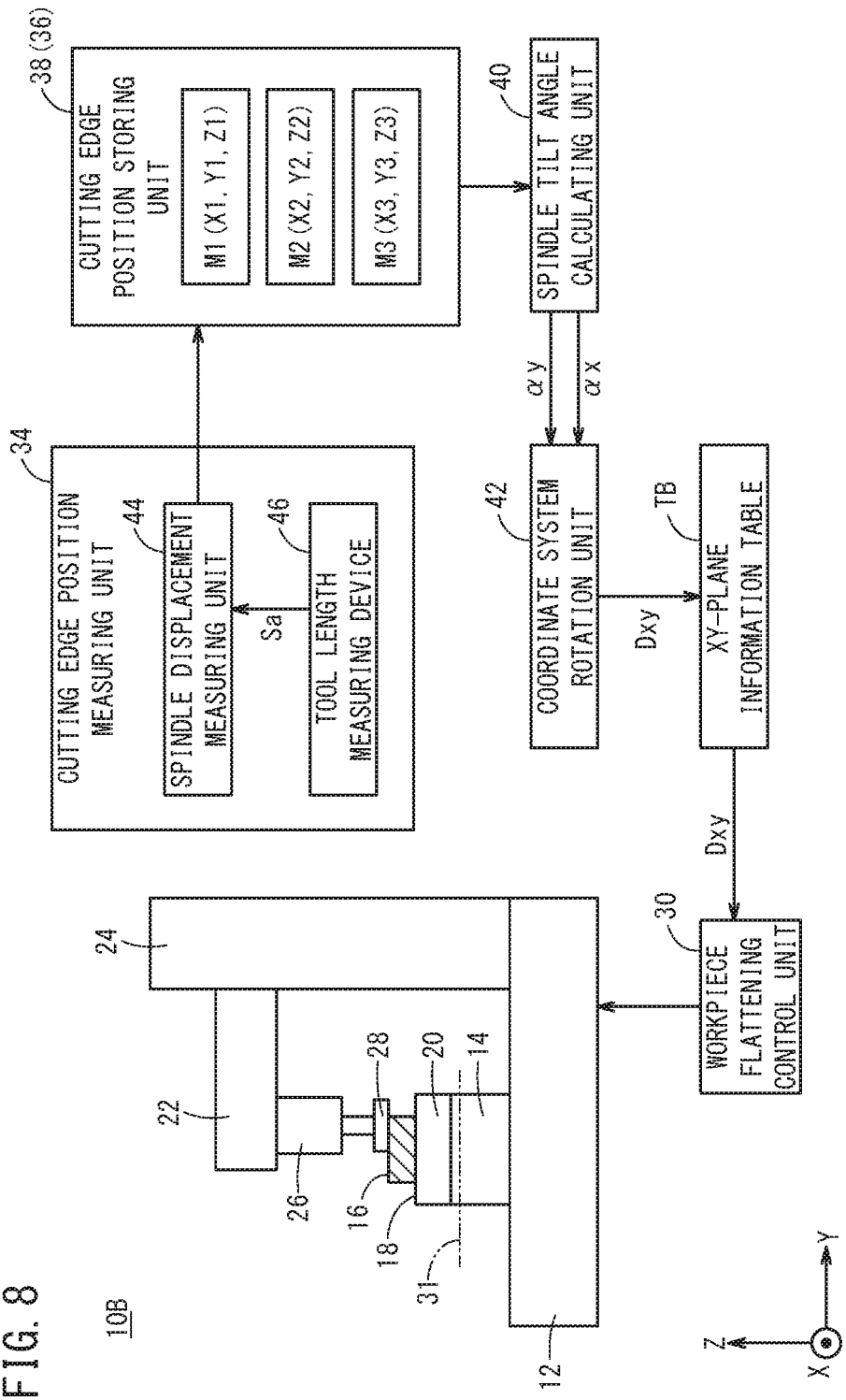
FIG. 8 is a configuration diagram showing a machine tool (second machine tool) according to a second embodiment of the present invention.

That is, as shown in FIG. 8, the second machine tool 10B stores multiple measured values (first to third measured values M1 to M3) that are obtained by positioning the specific tip 32a on the same tool length measuring device 46 at three different phases of the spindle 26, in the cutting edge position storing unit 38. The spindle tilt angle calculating unit 40, based on the multiple measured values stored in the cutting edge position storing unit 38, calculates the tilt angle of the spindle 26 with respect to the XY-plane 31, in particular, a tilt angle αy with respect to the Y-direction and a tilt angle αx in the X-direction.

The coordinate system rotation unit 42 generates the XY-plane 31 by driving the Z-axis simultaneously with driving the Y-axis and the X-axis such that the Y-axis and the X-axis are driven in directions to cancel the calculated tilt angle αy and tilt angle αx, respectively. As a result, the Y-direction and the X-direction of the generated XY-plane 31 become orthogonal to the spindle 26.

Next, the processing operation of the second machine tool 10B will be described with reference to FIG. 9 to FIG. 11C. It should be noted that repeated description on the similar steps to those in the first machine tool 10A will be omitted.

Figure 9:
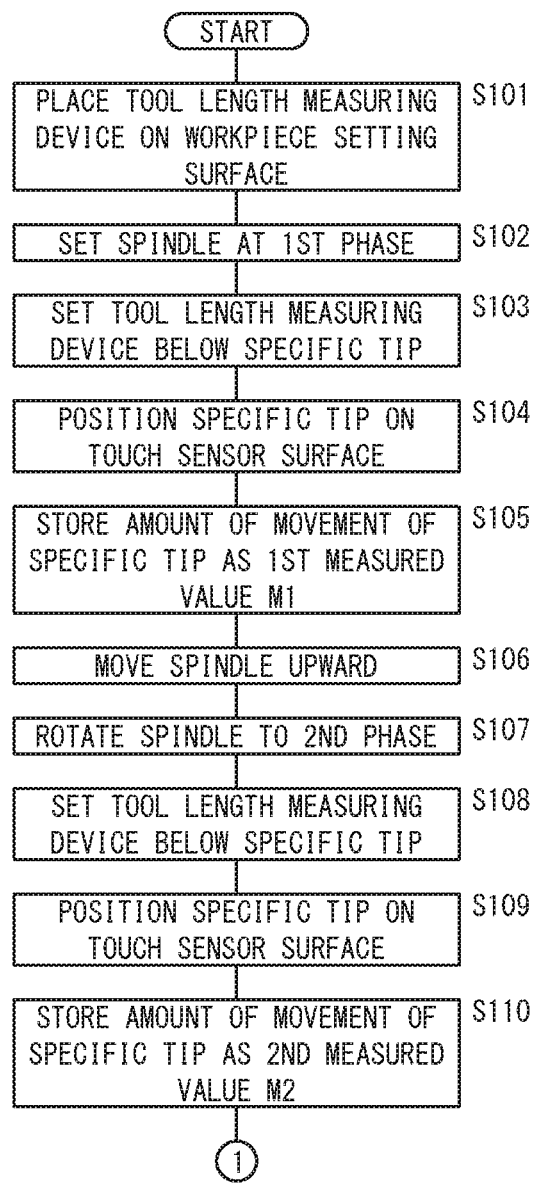
FIG. 9 is a flowchart (part 1) showing a processing operation of the second machine tool.
Figure 11A:
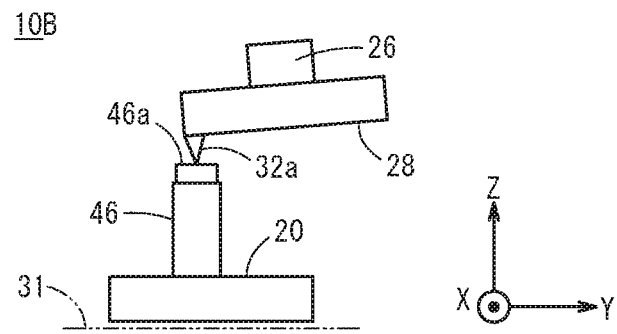
FIG. 11A is an illustrative view showing a state in which a specific tip is positioned on a touch sensor surface of a tool length measuring device with the spindle set at a first phase.

First, at steps S101 to S105 in FIG. 9, procedures similar to the above-described processing (steps S1 to S5) in the first machine tool 10A are performed as shown in FIG. 11A, and the amount of movement of the specific tip 32a is stored as a first measured value M1 in the cutting edge position storing unit 38. When storing the three-dimensional coordinates (X1, Y1, Z1) in the cutting edge position storing unit 38, X1=0 and Y1=0, and Z1 corresponds to the amount of movement of the specific tip 32a in the Z-direction. In this case, the amount of movement of the spindle 26 at the first phase is stored in the cutting edge position storing unit 38 as the first measured value M1. The first phase may be, for example, 0° or may be a different phase (for example, 37° etc.).

Thereafter, at step S106, the spindle 26 is moved upward, and, for example, returned to the machine zero point.

At step S107, the spindle 26 is rotated from the first phase to another phase (a second phase). The second phase may be, for example, 241° etc.

Figure 11B:
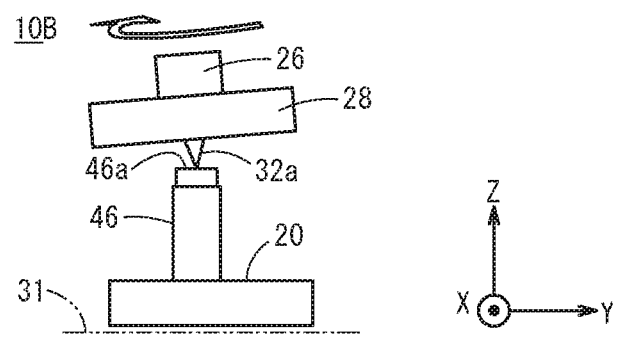
FIG. 11B is an illustrative view showing a state in which the spindle is set at a second phase from the first phase and positioned on the tool length measuring device.

At step S108, in order to enable the specific tip 32a to be measured by the tool length measuring device 46, that is, in order to position the central portion of the touch sensor surface 46a of the tool length measuring device 46 below the specific tip 32a, the table 20 and the saddle 14 are moved as shown in FIG. 11B.

At step S109, the spindle 26 is moved downward to position the specific tip 32a at the central portion of the touch sensor surface 46a of the tool length measuring device 46.

At step S110, the spindle displacement measuring unit 44 stores the displacement of the specific tip 32a, i.e., the amount of movement of the specific tip 32a, in the cutting edge position storing unit 38 as the second measured value M2. At this time, the three-dimensional coordinates (X2, Y2, Z2) may be stored in the cutting edge position storing unit 38. In this case, X2 corresponds to the amount of displacement in the X-direction on the XY-plane 31, Y2 corresponds to the amount of displacement in the Y-direction on the XY-plane, and Z2 corresponds to the amount of displacement of the spindle 26 in the Z-direction.

Figure 10:
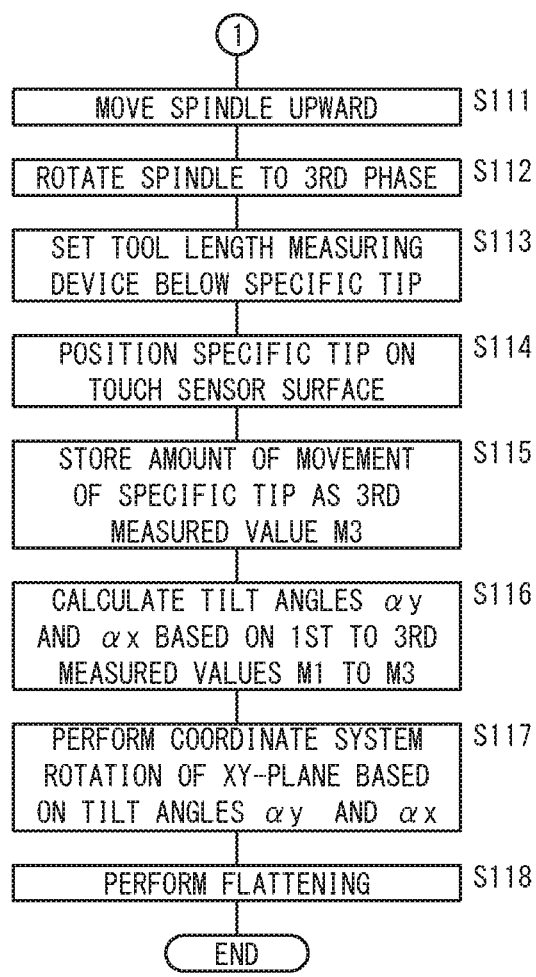
FIG. 10 is a flowchart (part 2) showing the processing operation of the second machine tool.

At step S111 in FIG. 10, the spindle 26 is moved upward and returned to the machine zero point.

At step S112, the spindle 26 is rotated from the second phase to another phase (a third phase). As the third phase, for example, 309° etc. can be taken.

Figure 11C:
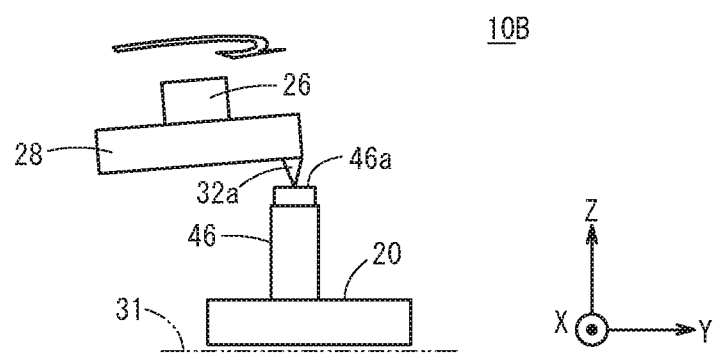
FIG. 11C is an illustrative view showing a state in which the spindle is set at a third phase from the second phase and positioned on the tool length measuring device.

At step S113, in order to enable the specific tip 32a to be measured by the tool length measuring device 46, that is, in order to position the central portion of the touch sensor surface 46a of the tool length measuring device 46 below the specific tip 32a, the table 20 and the saddle 14 are moved as shown in FIG. 11C.

At step S114, the spindle 26 is moved downward to position the specific tip 32a on the central portion of the touch sensor surface 46a of the tool length measuring device 46.

At step S115, the cutting edge position measuring unit 34 stores the displacement of the specific tip 32a, i.e., the amount of movement of the specific tip 32a, in the cutting edge position storing unit 38 as the third measured value M3. At this time, the cutting edge position storing unit 38 may store the three-dimensional coordinates (X3, Y3, Z3) therein. In this case, when the mounted position of the tool length measuring device 46 is defined as the origin, X3 corresponds to the displacement in the X-direction on the XY-plane 31, Y3 corresponds to the displacement in the Y-direction on the XY-plane 31, and Z3 corresponds to the displacement of the spindle 26 in the Z-direction.

At step S116, the spindle tilt angle calculating unit 40 calculates the tilt angle of the spindle 26 with respect to the XY-plane 31 based on the multiple measured values stored in the cutting edge position storing unit 38. That is, based on the stored X coordinates, Y coordinates and Z coordinates of the first, second and third measured values M1, M2 and M3, the tilt angle αx of the spindle 26 with respect to the X-direction and the tilt angle αy thereof with respect to the Y-direction are calculated using trigonometric functions.

At step S117, the coordinate system rotation unit 42 rotates the XY-plane 31 around the Y-axis by the tilt angle αx of the spindle 26 calculated by the spindle tilt angle calculating unit 40 and rotates the XY-plane 31 around the X-axis by the tilt angle αy of the spindle 26 calculated.

More specifically, the coordinate system rotation unit 42 generates the rotated XY-plane 31 by driving the Z-axis simultaneously with driving the Y-axis and the X-axis such that the Y-axis and the X-axis are driven in directions to cancel the calculated tilt angle αy and tilt angle αx, respectively. As a result, the Y-direction and the X-direction of the generated XY-plane 31 become orthogonal to the spindle 26.

At step S118, the workpiece flattening control unit 30 performs flattening on the workpiece 16 fixed on the workpiece setting surface 18 along the XY-plane 31 generated by coordinate system rotation by the coordinate system rotation unit 42.

At this time, since the Y-direction of the XY-plane 31 and the spindle 26 are orthogonal to each other, even if milling is performed multiple times on multiple paths in the X-direction, a level difference hardly occurs on the workpiece 16 as shown in FIG. 7 so that a good flat surface can be formed on the workpiece 16. That is, the flatness of the machined surface of the workpiece 16 can be improved.

In the second machine tool 10B, since both the X-direction and the Y-direction of the XY-plane 31 are made orthogonal to the spindle 26, it is possible to further improve machining accuracy compared to the first machine tool 10A. In particular, there are some cases where priority is given to the flatness of the machined surface while not caring that the side face shape of the workpiece becomes more or less trapezoidal, depending on the tolerance of the machined product. In such a case, this configuration can exhibit remarkable effectiveness.

<Third Machine Tool>

Next, a machine tool according to a third embodiment (hereinafter referred to as a third machine tool 10C) will be described with reference to FIGS. 12 to 15B. The overall configuration of the third machine tool is substantially the same as that of the first machine tool 10A shown in FIG. 1.

Figure 12:
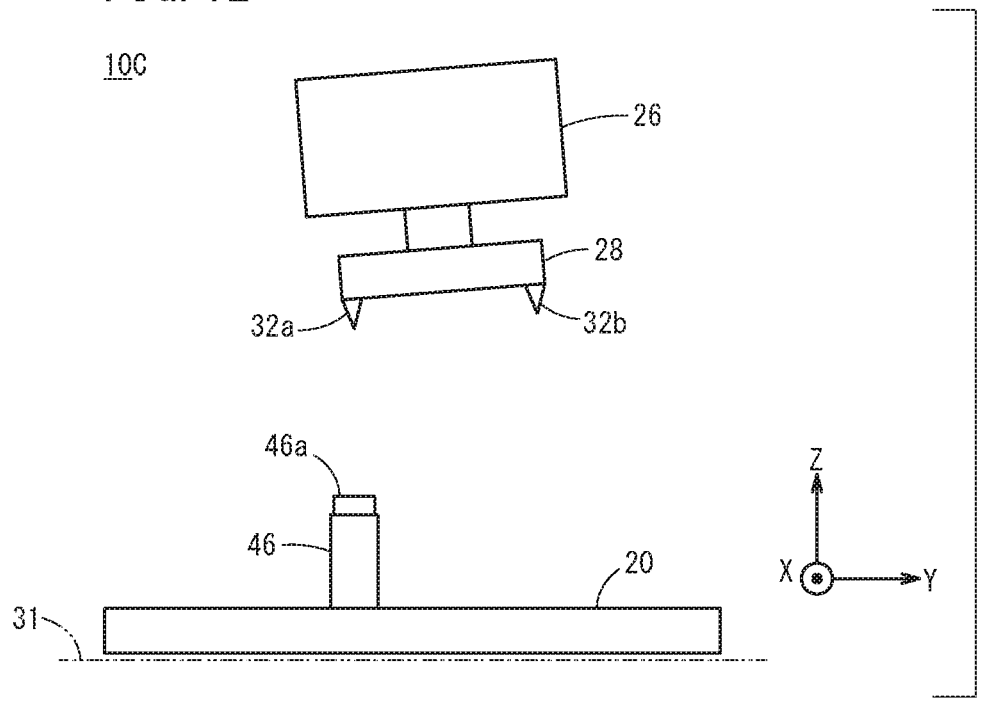
FIG. 12 is an illustrative view showing characteristics of a machine tool (third machine tool) according to the third embodiment.

As shown in FIG. 12, the third machine tool 10C has substantially the same configuration as that of the first machine tool 10A described above, except that two specific tips (a first specific tip 32a and a second specific tip 32b) are mounted on the spindle 26 at 180° opposite to each other.

Now, the processing operation of the third machine tool 10C will be described with reference to FIGS. 13 to 15B. It should be noted that repeated description on the similar steps to those in the first machine tool 10A will be omitted.

Figure 13:
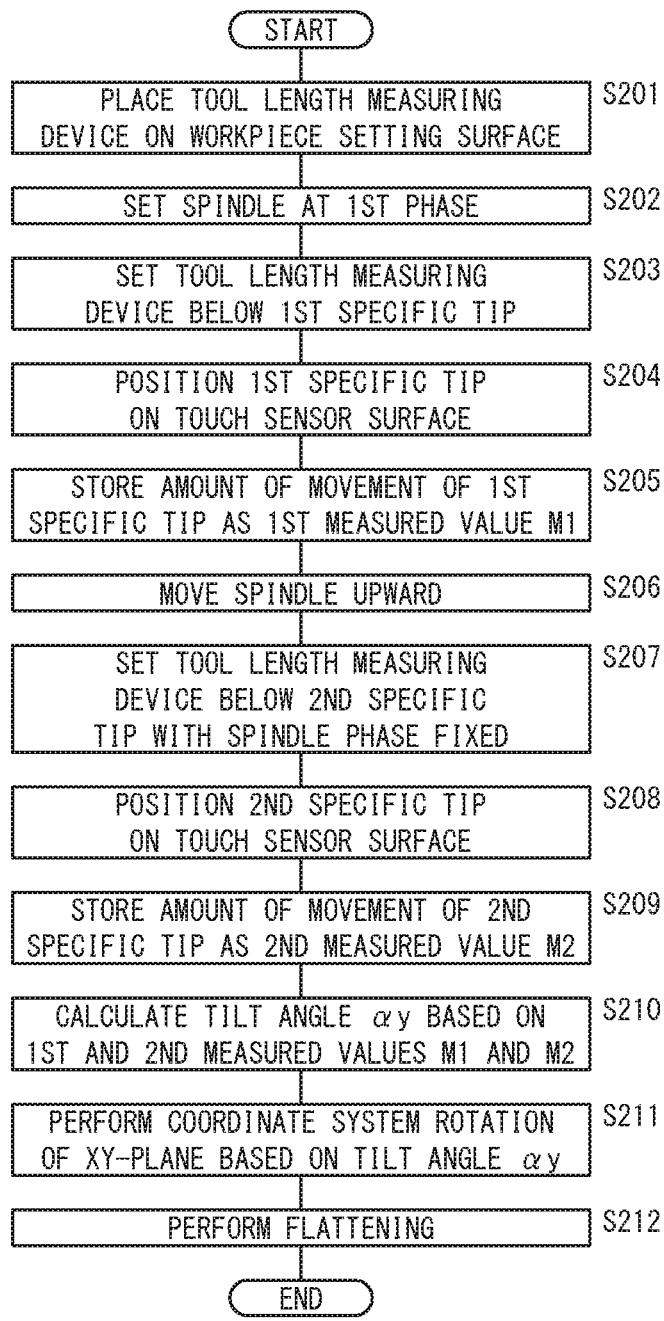
FIG. 13 is a flowchart showing a processing operation of a third machine tool of the present invention.
Figure 14A:
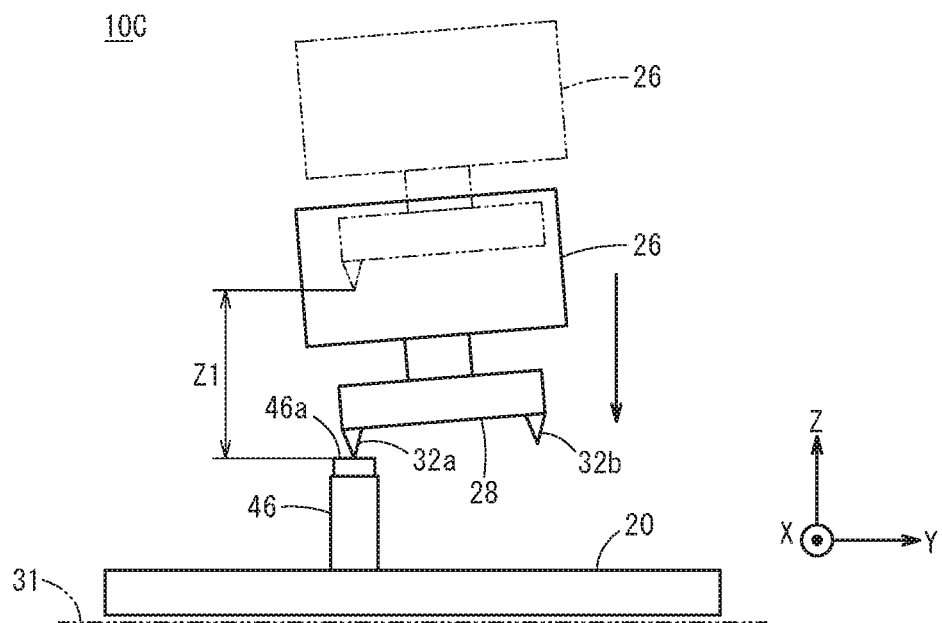
FIG. 14A is a view showing a state in which a first specific tip is positioned on a touch sensor surface of a tool length measuring device with the spindle set at a first phase, as viewed from the X-direction.
Figure 14B:
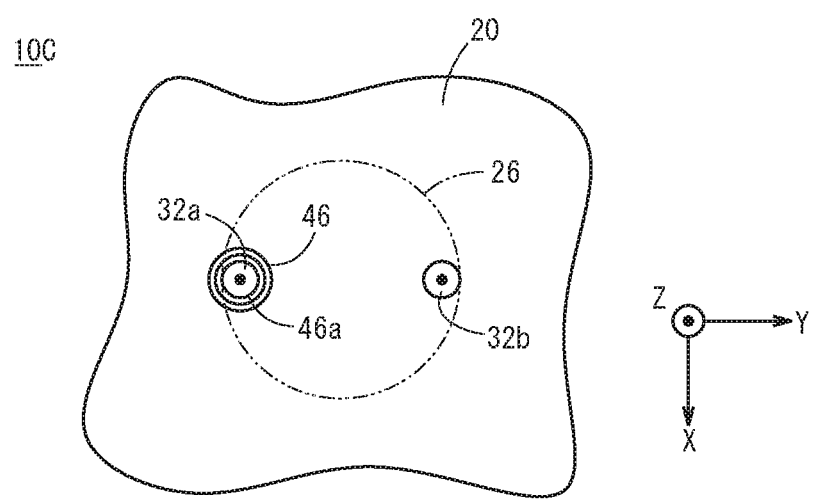
FIG. 14B is a view showing the state shown in FIG. 14A when viewed from the Z-direction, with its part omitted.

First, in steps S201 to S205 of FIG. 13, procedures similar to the above-described processing (steps S1 to S5) in the first machine tool 10A are performed as shown in FIGS. 14A and 14B, and the amount of movement of a first specific tip 32a is stored as a first measured value M1 (X1, Y1, Z1) in the cutting edge position storing unit 38. In this case, X1=0, Y1=0, and Z1 corresponds to the amount of movement of the first specific tip 32a in the Z-direction.

At step S206, the spindle 26 is moved upward, and, for example, returned to the machine zero point.

Figure 15A:
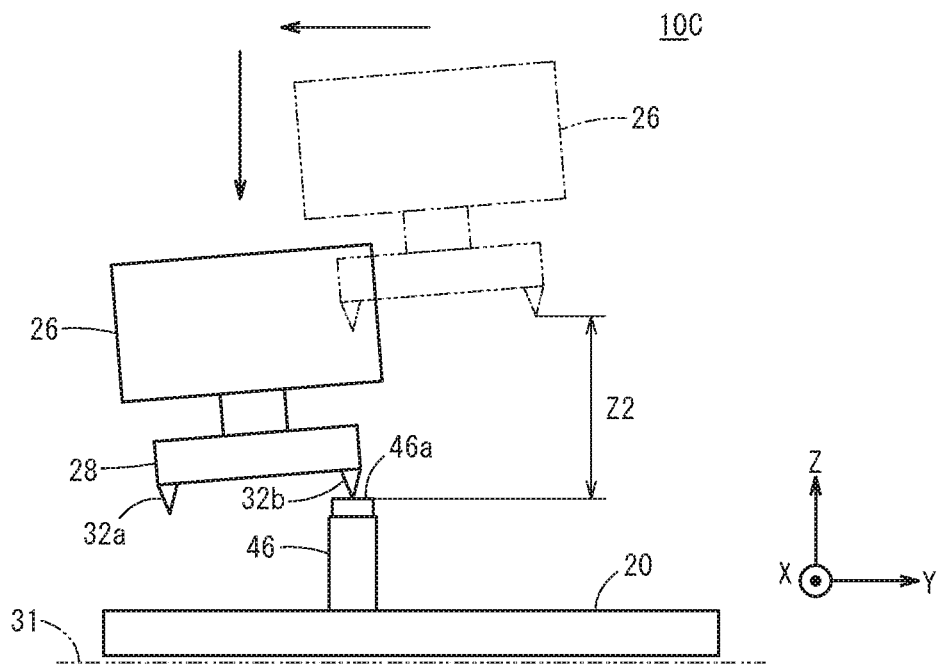
FIG. 15A is a view showing a state in which a second specific tip is positioned on the touch sensor surface of the tool length measuring device without changing the phase of the spindle, as viewed from the X-direction.
Figure 15B:
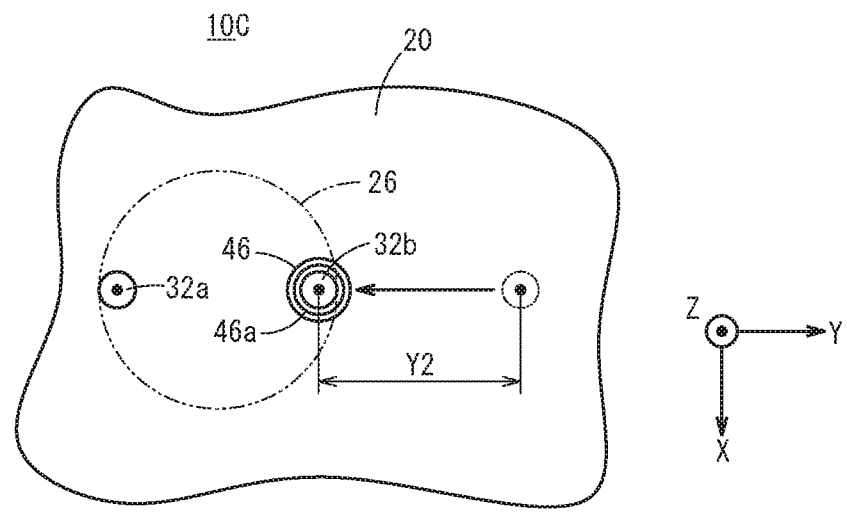
FIG. 15B is a view showing the state shown in FIG. 15A when viewed from the Z-direction, with its part omitted.

At step S207, in order to enable the second specific tip 32b to be measured by the tool length measuring device 46 without changing the phase of the spindle 26, that is, in order to position the central portion of the touch sensor surface 46a of the tool length measuring device 46 below the second specific tip 32b, the table 20 and the saddle 14 are moved as shown in FIGS. 15A and 15B.

Thereafter, at step S208, the spindle 26 is moved downward to position the second specific tip 32b at the center portion of the touch sensor surface 46a of the tool length measuring device 46.

At step S209, the cutting edge position measuring unit 34 stores the displacement of the second specific tip 32b, i.e., the amount of movement of the second specific tip 32b, in the cutting edge position storing unit 38 as the second measured value M2 (X2, Y2, Z2). In this case, since no displacement is made on the X coordinate, X2=0. Y2 corresponds to the displacement in the Y-direction of the XY-plane 31, and Z2 corresponds to the displacement of the spindle 26.

At step S210, the spindle tilt angle calculating unit 40 calculates the tilt angle of the spindle 26 with respect to the XY-plane 31 based on the first and second measured values M1 and M2 stored in the cutting edge position storing unit 38. As in the case of the first machine tool 10A, trigonometric functions are used to calculate the tilt angle αy of the spindle 26 with respect to the Y-axis from the stored Y-coordinates and Z-coordinates of the first and second measured values M1 and M2.

At step S211, the coordinate system rotation unit 42 rotates the XY-plane 31 around the X-axis by the tilt angle αy of the spindle 26 calculated by the spindle tilt angle calculating unit 40.

At step S212, the workpiece flattening control unit 30 performs flattening on the workpiece 16 fixed on the workpiece setting surface 18 along the XY-plane 31 generated by coordinate system rotation by the coordinate system rotation unit 42.

At this time, since the Y-direction of the XY-plane 31 and the spindle 26 are orthogonal to each other, even if milling is performed multiple times on multiple paths in the X-axis direction, a level difference hardly occurs on the workpiece 16 as shown in FIG. 7 so that a good flat surface can be formed on the workpiece 16. That is, the flatness of the machined surface of the workpiece 16 can be improved.

The third machine tool 10C can be preferably implemented as long as the first specific tip 32a and the second specific tip 32b are located at 180° opposite to each other while the mounted errors of these tips do not affect the machining accuracy. According to the third machine tool 10C, the tilt angle αy of the spindle 26 can be determined by positioning and measurement of the spindle 26 at the first phase only, hence it is possible to reduce the number of steps and the work time for making the Y-direction of the XY-plane and the spindle 26 orthogonal to each other.

<Fourth Machine Tool>

Referring next to FIGS. 16 and 17, a machine tool according to a fourth embodiment (hereinafter referred to as a fourth machine tool 10D) will be described.

The fourth machine tool 10D has substantially the same configuration as the third machine tool 10C described above, except that both the X-direction and the Y-direction of the XY-plane 31 are made orthogonal to the spindle 26.

That is, as shown in FIG. 16, the fourth machine tool 10D stores multiple measured values (first to fourth measured values M1 to M4) that are obtained by positioning first and second specific tips 32a and 32b (see FIG. 12) on the same tool length measuring device 46 at two different phases of the spindle 26, in the cutting edge position storing unit 38.

The spindle tilt angle calculating unit 40, based on the multiple measured values stored in the cutting edge position storing unit 38, calculates the tilt angle of the spindle 26 with respect to the XY-plane 31, in particular, the tilt angle αy with respect to the Y-direction and the tilt angle αx in the X-direction.

Similar to the second machine tool 10B, the coordinate system rotation unit 42 generates the rotated XY-plane 31 by driving the Z-axis simultaneously with driving the Y-axis and the X-axis such that the Y-axis and the X-axis are driven in directions to cancel the calculated tilt angle αy and tilt angle αx, respectively. As a result, the Y-direction and the X-direction of the generated XY-plane 31 become orthogonal to the spindle 26.

Now, the processing operation of the fourth machine tool 10D will be described with reference to FIG. 17. It should be noted that repeated description on the similar steps to those in the third machine tool 10C will be omitted.

First, at steps S301 to S309 in FIG. 17, procedures similar to the above-described processing (steps S201 to S209) in the third machine tool 10C are performed, and the amount of movement of the first specific tip 32a is stored as a first measured value M1 (X1, Y1, Z1) in the cutting edge position storing unit 38. Then, the amount of movement of the second specific tip 32b is stored as a second measured value M2 (X2, Y2, Z2) in the cutting edge position storing unit 38.

Figure 18:
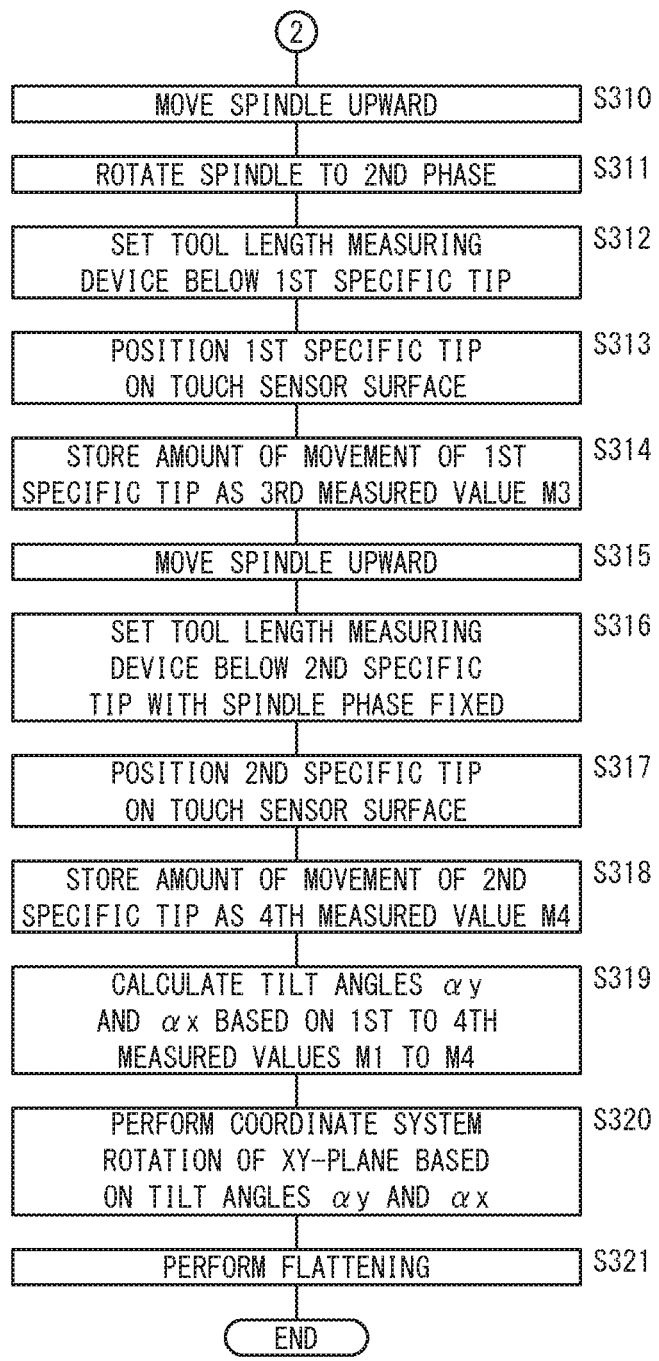
FIG. 18 is a flowchart (part 2) showing the processing operation of the fourth machine tool.

Thereafter, at step S310 in FIG. 18, the spindle 26 is moved upward, and, for example, returned to the machine zero point.

At step S311, the spindle 26 is rotated from the first phase to another phase (a second phase).

At step S312, in order to enable the first specific tip 32a to be measured again by the tool length measuring device 46, that is, in order to position the central portion of the touch sensor surface 46a of the tool length measuring device 46 below the first specific tip 32a, the table 20 and the saddle 14 are moved.

At step S313, the spindle 26 is moved downward to position the first specific tip 32a at the central portion of the touch sensor surface 46a of the tool length measuring device 46.

At step S314, the cutting edge position measuring unit 34 stores the displacement of the first specific tip 32a, i.e., the amount of movement of the first specific tip 32a, in the cutting edge position storing unit 38, as the third measured value M3 (X3, Y3, Z3).

At step S315, the spindle 26 is moved upward, and returned to, for example, the machine zero point.

At step S316, in order to enable the second specific tip 32b to be measured by the tool length measuring device 46 while keeping the spindle 26 at the second phase, that is, in order to position the central portion of the touch sensor surface 46a of the tool length measuring device 46 below the second specific tip 32b, the table 20 and the saddle 14 are moved.

At step S317, the spindle 26 is moved downward to position the second specific tip 32b at the central portion of the touch sensor surface 46a of the tool length measuring device 46.

At step S318, the cutting edge position measuring unit 34 stores the displacement of the second specific tip 32b, i.e., the amount of movement of the second specific tip 32b as the fourth measured value M4 (X4, Y4, Z4) in the cutting edge position storing unit 38.

At step S319, the spindle tilt angle calculating unit 40 determines the tilt angles $\alpha x$ and $\alpha y$ of the spindle 26 with respect to the XY-plane 31, based on the first to fourth measured values M1 to M4 stored in the cutting edge position storing unit 38.

At step S320, the coordinate system rotation unit 42 generates the XY-plane 31 by driving the Z-axis simultaneously with driving the Y-axis and the X-axis such that the Y-axis and the X-axis are driven in directions to cancel the calculated tilt angle $\alpha y$ and tilt angle $\alpha x$, respectively. As a result, the Y-direction and the X-direction of the XY-plane 31 become orthogonal to the spindle 26.

At step S321, the workpiece flattening control unit 30 performs flattening on the workpiece 16 fixed on the workpiece setting surface 18 along the XY-plane 31 formed by coordinate system rotation by the coordinate system rotation unit 42.

In this fourth machine tool, since both the X-direction and the Y-direction of the XY-plane 31 are set orthogonal to the spindle 26, a level difference hardly occurs on the workpiece 16 so that a good flat surface can be formed on the workpiece 16. In addition, the machining accuracy can be further improved as compared with the third machine tool 10C. Further, there are some cases where priority is given to the flatness while not caring that the side face shape of the workpiece becomes more or less trapezoidal, depending on the tolerance of the machined product. In such a case, this configuration can exhibit remarkable effectiveness.

The fourth machine tool 10D can be preferably implemented as long as the first specific tip 32a and the second specific tip 32b are located at 180° opposite to each other while the mounted errors of these tips do not affect the machining accuracy. According to the fourth machine tool 10D, the tilt angles $\alpha x$ and $\alpha y$ of the spindle 26 can be determined by positioning and measurement of the spindle 26 at the first phase and positioning and measurement of the spindle 26 at the second phase only, hence it is possible to reduce the number of steps and the work time for making the X-direction of the XY-plane 31 orthogonal to the spindle 26 and making the Y-direction of the XY-plane 31 orthogonal to the spindle 26.

<Fifth Machine Tool>

Next, a machine tool according to a fifth embodiment (hereinafter referred to as a fifth machine tool 10E) will be described with reference to FIGS. 19 to 23B.

Figure 19:
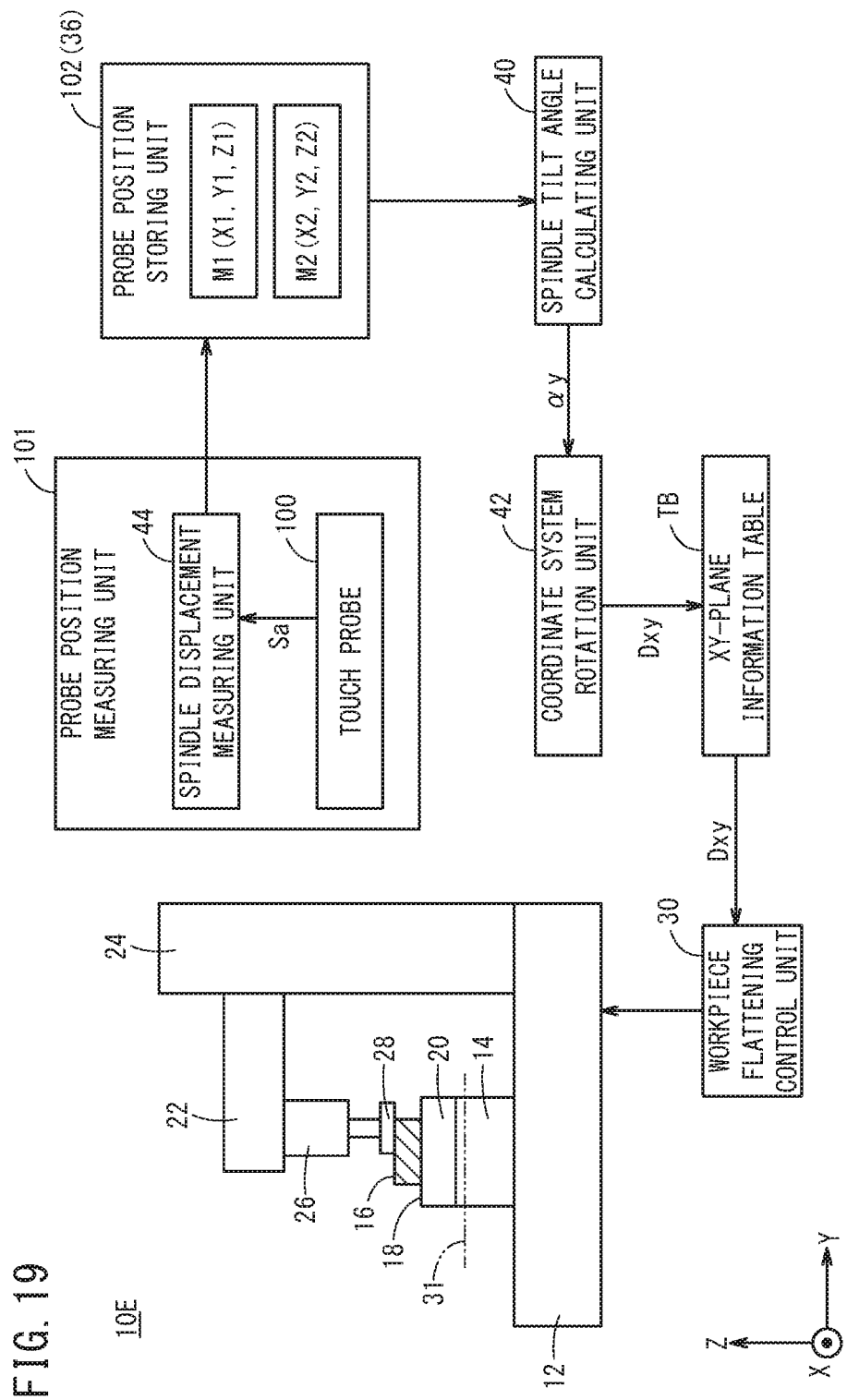
FIG. 19 is a configuration diagram showing a machine tool (fifth machine tool) according to a fifth embodiment of the present invention.

As shown in FIG. 19, the fifth machine tool 10E has substantially the same configuration as that of the first machine tool 10A described above, except that the fifth machine tool includes a probe position measuring unit 101 using a touch probe 100, instead of the tool length measuring device 46, and a probe position storing unit 102 as the contact element position storing unit 36 for performing the same processing as the cutting edge position storing unit 38, instead thereof.

Figure 20A:
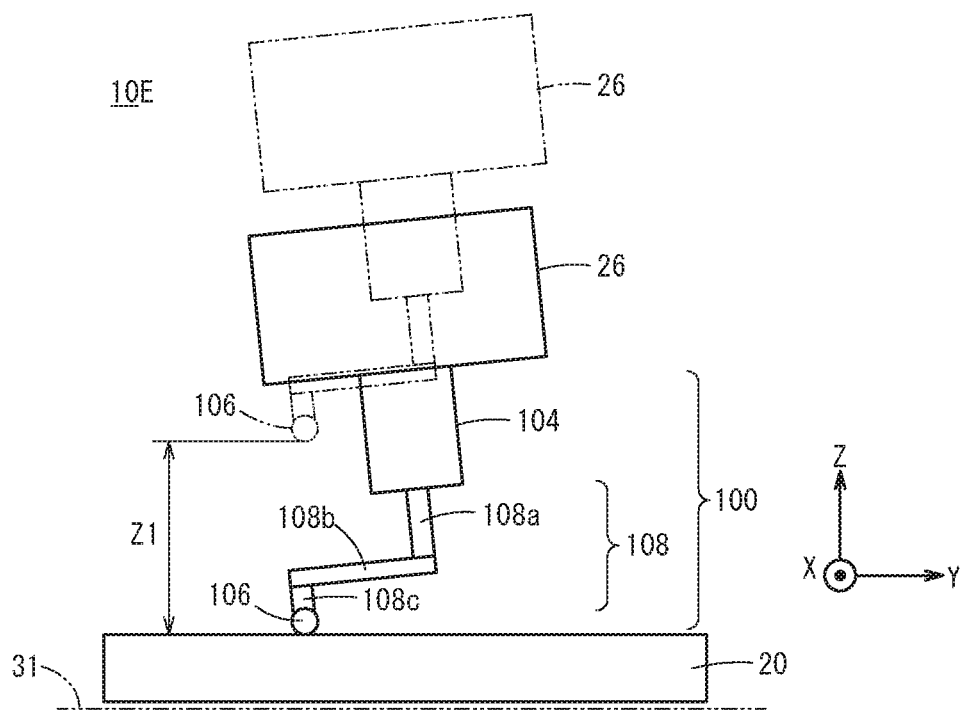
FIG. 20A is a view showing a state in which a probe element of a touch probe is positioned at a specific position on the workpiece setting surface, as viewed from the X-direction.

As shown in FIG. 20A, the touch probe 100 includes a sensor unit 104 attached to a portion of the spindle 26 corresponding to the workpiece setting surface 18, and a shank assembly 108 extending downward from the bottom of the sensor unit 104 and then bent or curved in the middle, and which has a spherical probe element 106 as a contact element fixed at the distal end thereof. The shank assembly 108 includes a first shank portion 108a extending downward from the bottom of the sensor unit 104, a second shank portion 108b extending laterally from the bottom of the first shank portion 108a and a third shank portion 108c extending downward from the distal end of the second shank portion 108b. The probe element 106 is fixed to the distal end of the third shank portion 108c.

Then, as will be described later, the spindle 26 is moved toward the workpiece setting surface 18, and when the probe element 106 contacts the workpiece setting surface 18, that is, when the probe element 106 of the touch probe 100 is positioned, the sensor unit 104 outputs a detection signal Sa to the spindle displacement measuring unit 44.

The spindle displacement measuring unit 44 measures the amount of movement of the spindle 26 from when the downward movement of the spindle 26 is started, and based on the input of the detection signal Sa from the sensor unit 104 of the touch probe 100, stores the measured value including the amount of movement of the probe element 106 in the probe position storing unit 102.

That is, the probe position storing unit 102 stores therein multiple measured values (the first measured value M1 and the second measured value M2) obtained by performing the positioning process of the probe element 106 twice using the touch probe 100.

Now, the processing operation of the fifth machine tool 10E will be described with reference also to FIGS. 21 to 23B. It is assumed that the spindle 26 is located at the machine zero point in the initial state.

Figure 20B:
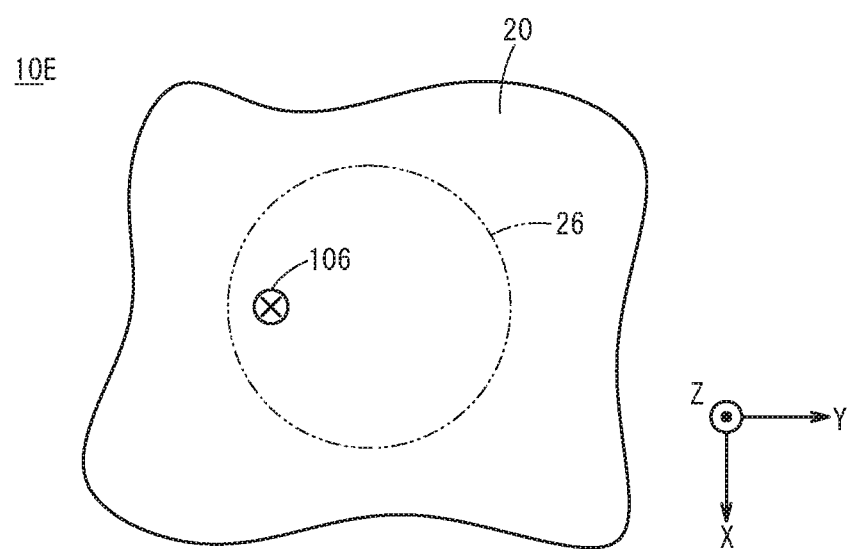
FIG. 20B is a view showing the state shown in FIG. 20A when viewed from the Z-direction, with its part omitted.
Figure 21:
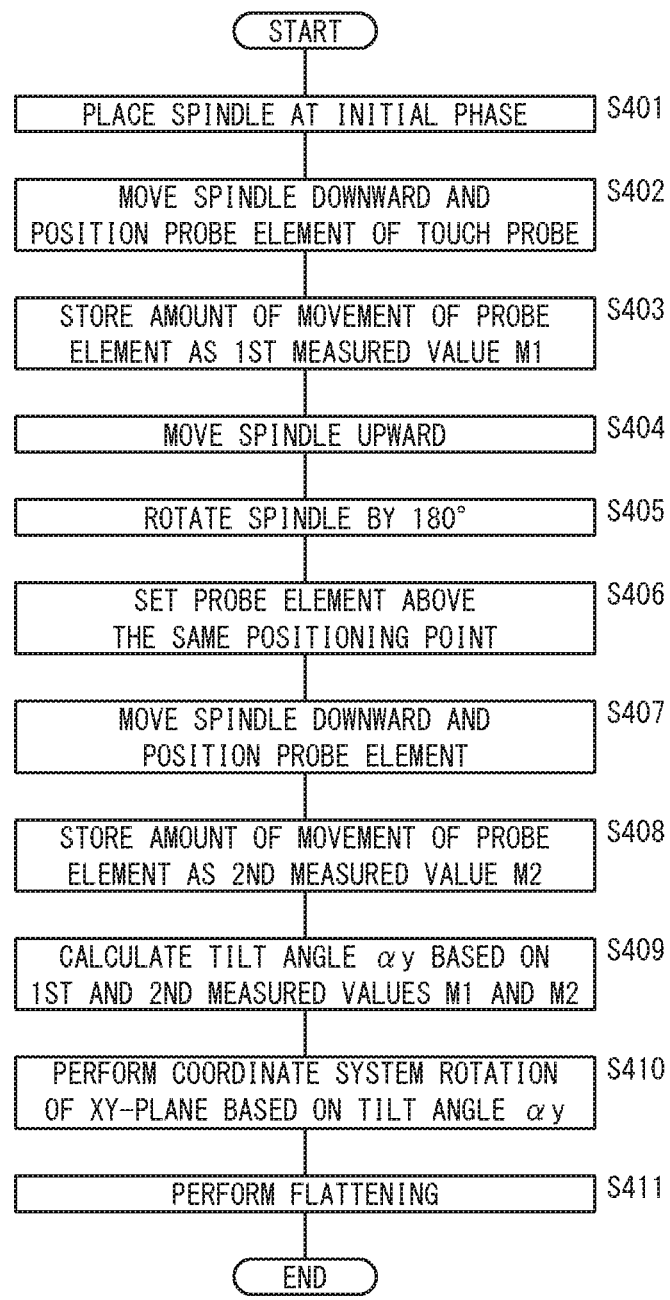
FIG. 21 is a flowchart showing a processing operation of the fifth machine tool.

First, at step S401 in FIG. 21, as shown in FIGS. 20A and 20B, the spindle 26 is set at a first phase at which the probe element 106 of the touch probe 100 provided at the lower end of the spindle 26 is oriented in the Y-direction.

At step S402, the spindle 26 is moved downward, and then the probe element 106 of the touch probe 100 is brought into contact with a specific position on the workpiece setting surface 18 (the position indicated by x in FIG. 20B and others) to thereby position the probe element 106.

At step S403, the spindle displacement measuring unit 44 stores the displacement of the spindle 26, i.e., the amount of movement of the probe element 106, as the first measured value M1 (X1, Y1, Z1) in the probe position storing unit 102. Since the X-coordinate and the Y-coordinate are not changed, X1=0, Y1=0, and Z1 corresponds to the amount of movement of the probe element 106 in the Z-direction.

At step S404, the spindle 26 is moved upward and returned to the machine zero point.

Figure 22A:
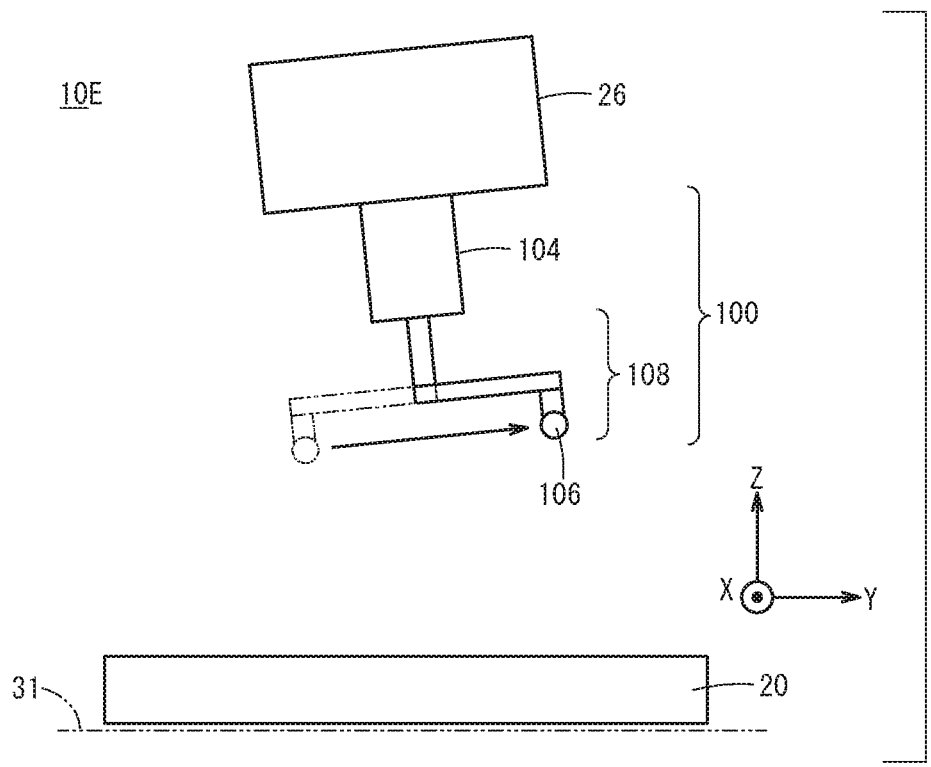
FIG. 22A is a view showing a state in which the spindle is rotated by 180 degrees after moving the spindle upward from the state of FIG. 20A, as viewed from the X-direction.
Figure 22B:
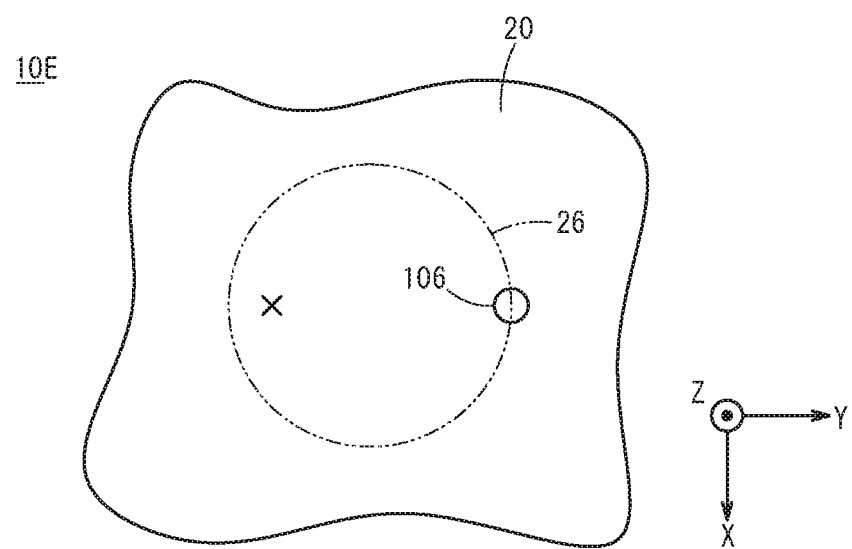
FIG. 22B is a plan view showing the state shown in FIG. 22A as viewed from the Z-direction, with its part omitted.

At step S405, as shown in FIGS. 22A and 22B, the spindle 26 is rotated by 180° from the first phase.

At step S406, the table 20 and the saddle 14 are moved such that the probe element 106 can be positioned again at the aforementioned specific position on the workpiece setting surface 18.

Figure 23A:
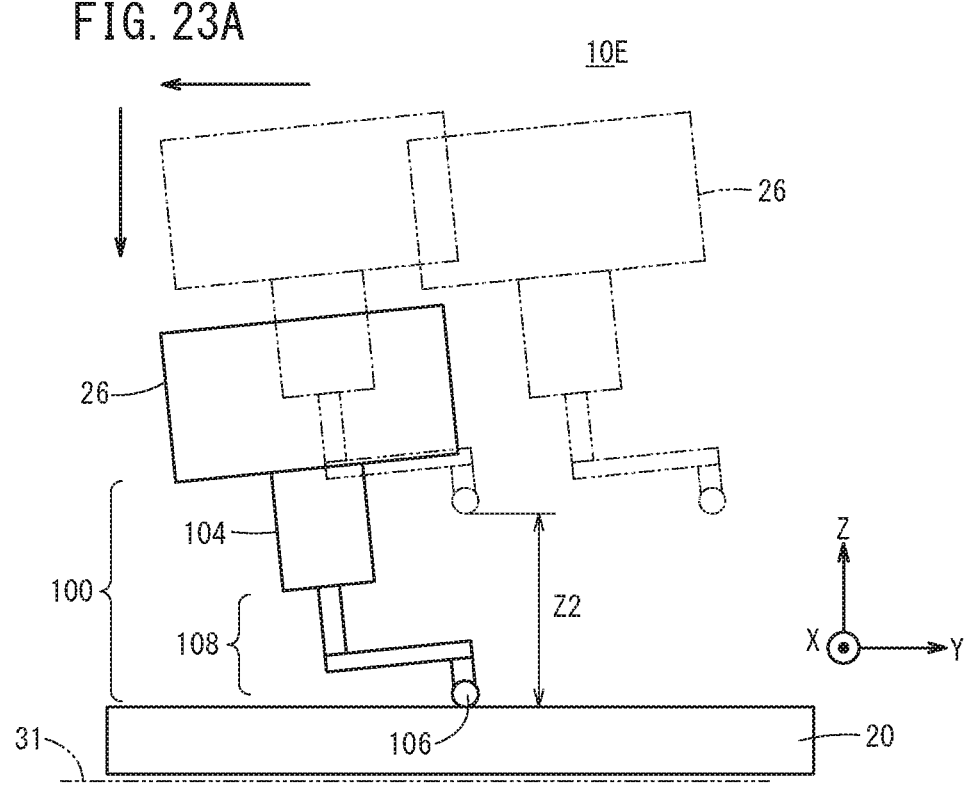
FIG. 23A is a view showing a state in which the probe element of the touch probe is positioned at a specific position on the workpiece setting surface from the state of FIG. 22A, as viewed from the X-direction.
Figure 23B:
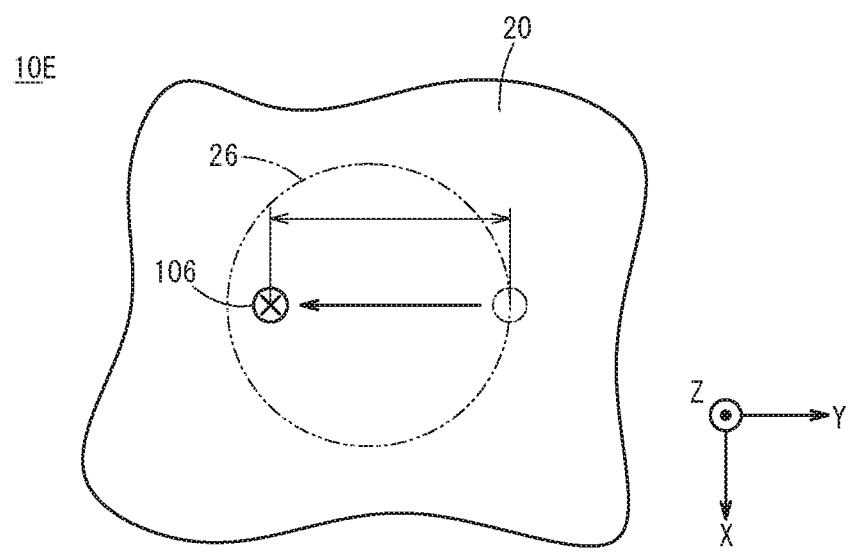
FIG. 23B is a view showing the state shown in FIG. 23A as viewed from the Z-direction, with its part omitted.

At step S407, as shown in FIGS. 23A and 23B, the spindle 26 is moved downward to position the probe element 106 of the touch probe 100.

At step S408, the spindle displacement measuring unit 44 stores the displacement of the spindle 26, i.e., the amount of movement of the probe element 106, as the second measured value M2 (X2, Y2, Z2) in the probe position storing unit 102. As for the X coordinate, since no movement is made in the X-direction, X2=0. Y2 corresponds to the displacement in the Y-direction of the XY-plane 31, and Z2 corresponds to the displacement of the spindle 26.

At step S409, the spindle tilt angle calculating unit 40, based on the first and second measured values M1 and M2 stored in the probe position storing unit 102, determines the tilt angle αy of the spindle 26 with respect to the XY-plane 31. In the above example, since the X-axis coordinates are the same, the tilt angle αy of the spindle 26 is determined from the stored Y-axis coordinates and Z-axis coordinates of the first measured value M1 and second measured value M2 by using trigonometric functions.

At step S410, the coordinate system rotation unit 42 rotates the XY-plane 31 around the X-axis by the tilt angle αy of the spindle 26 calculated by the spindle tilt angle calculating unit 40. More specifically, the coordinate system rotation unit 42 drives the Z-axis simultaneously with driving the Y-axis such that the Y-axis is driven in a direction to cancel the calculated tilt angle αy. As a result, the Y-direction of the XY-plane 31 becomes orthogonal to the spindle 26.

At step S411, the workpiece flattening control unit 30 performs flat-surface machining on the workpiece 16 fixed on the workpiece setting surface 18 along the XY-plane 31 generated by coordinate system rotation performed by the coordinate system rotation unit 42.

At this time, similarly to the first machine tool 10A, even if milling is performed multiple times on multiple paths in the X-direction, a level difference hardly occurs in the workpiece 16 so that a good flat surface can be formed on the workpiece 16. In particular, in the fifth machine tool 10E, since the touch probe 100 mounted on the spindle 26 is used, it is not necessary to attach a special measuring device on the table 20 side, and thus it is possible to secure an installation space on the top surface of the table 20.

In the fifth machine tool 10E, the reason why the phase of the spindle 26 is rotated by 180° is as follows. If multiple probe elements 106 are provided, there occur cases where the multiple probe elements 106 cannot be located at positions 180° apart from one another, due to mounting errors of the multiple probe elements 106. To deal with this, by use of a single probe element 106 for measurement, the measurement is not influenced by the mounting errors of multiple probe elements 106. Thus, it is possible to establish an orthogonal relationship between the Y-direction of the XY-plane 31 and the spindle 26 with high precision.

As a matter of course, similarly to the above-described second machine tool 10B, based on the multiple measured values (first to third measured values M1 to M3) obtained by positioning the probe element 106 on specific positions at three different phases of the spindle 26, the tilt angle αy of the spindle 26 in the Y-direction and the tilt angle αx in the X-direction with respect to the XY-plane 31 may be obtained. Then, the coordinate system rotation unit 42 generates an XY-plane 31 by driving the Z-axis simultaneously driving the Y-axis and the X-axis such that the Y-axis and the X-axis are driven in directions to cancel the calculated tilt angle αy and tilt angle αx, respectively, whereby it is possible to make the Y-axis direction and the X-direction of the generated XY-plane 31 orthogonal to the spindle 26.

Figure 24:
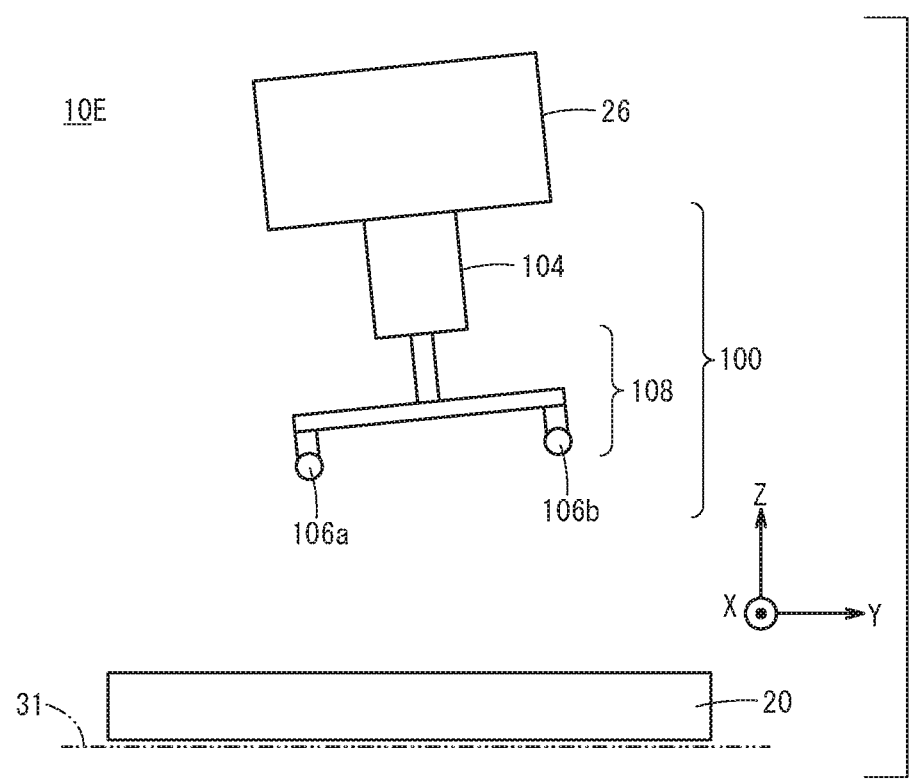
FIG. 24 is a view showing a modification example of the touch probe as viewed from the X-direction.

Further, similar to the first and second specific tips 32a and 32b used in the third machine tool 10C, a touch probe 100 having two probe elements (first and second probe elements 106a and 106b) arranged at 180° opposite to each other may be used, as shown in FIG. 24.

This configuration can be preferably implemented as long as the first probe element 106a and the second probe element 106b are located at 180° opposite to each other while the mounted errors of these probe elements do not affect the machining accuracy. Further, the tilt angle αy of the spindle 26 can be determined by positioning and measurement of the spindle 26 at the first phase only, hence it is possible to reduce the number of steps and the work time for making the Y-direction of the XY-plane 31 and the spindle 26 orthogonal to each other.

<Sixth Machine Tool>

Figure 25:
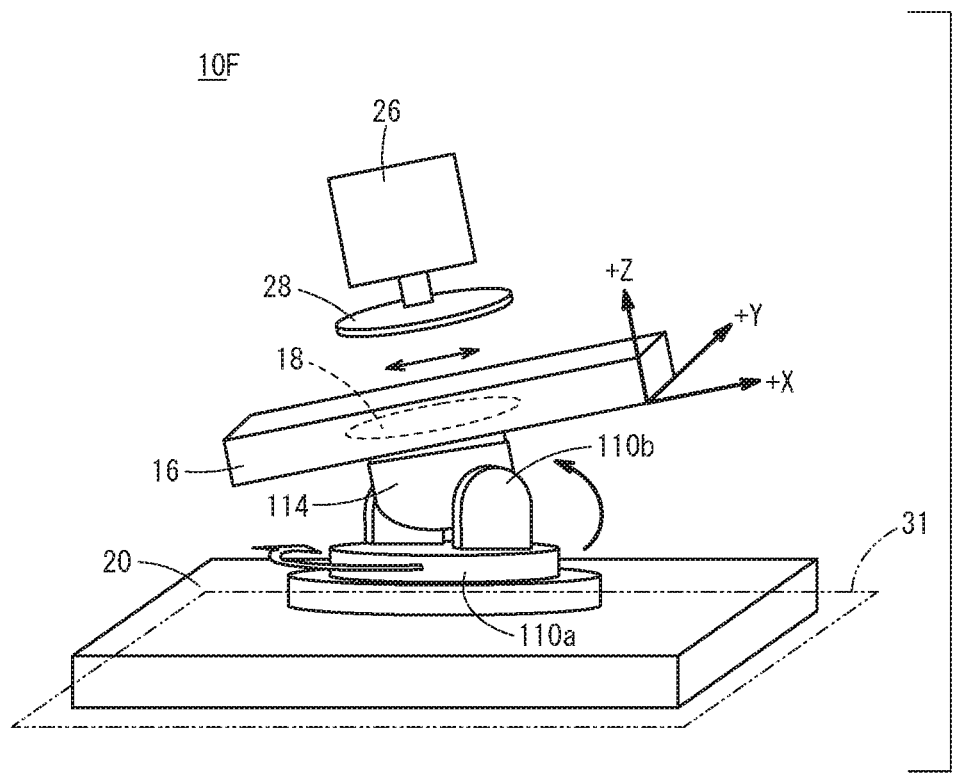
FIG. 25 is a configuration diagram showing a machine tool (sixth machine tool) according to a sixth embodiment of the present invention.

Next, a machine tool according to a sixth embodiment (hereinafter referred to as a sixth machine tool 10F) will be described with reference to FIG. 25.

In the second machine tool 10B, the fourth machine tool 10D and the like described above, the positional relationship between the XY-plane 31 and the spindle 26 is corrected (coordinate system rotation) to be placed in an orthogonal relation, based on the tilt angle of the spindle 26 relative to the XY-plane 31 before correction.

Incidentally, when the workpiece 16 is set on the top surface of the table 20, the top surface of the table 20 forms the workpiece setting surface 18. In this case, since the XY-plane 31 and the workpiece setting surface 18 of the table 20 are not necessarily parallel to each other, there are some cases where the side face shape of the workpiece 16 cannot be machined in a rectangular shape.

Therefore, the sixth machine tool 10F has a means for making the XY-plane 31 and the workpiece setting surface 18 parallel to each other. That is, instead of setting the workpiece setting surface 18 on the top surface of the table 20, a workpiece setting surface 18 parallel to the XY-plane 31 is newly set. Incidentally, as a means for making the XY-plane 31 and the spindle 26 orthogonal to each other, the second machine tool 10B, the fourth machine tool 10D and the like described above can be adopted.

The sixth machine tool 10F has a two-axis table 112 capable of freely changing the posture by two rotational axes (a first rotational axis 110a and a second rotational axis 110b), on the top surface of the table 20.

The two-axis table 112 includes a support 114 for supporting the workpiece 16 so as to face the spindle 26, a second rotational axis 110b for rotationally driving the support 114 about a horizontal axis, and a first rotational axis 110a for rotationally driving the support 114 and the second rotational axis 110b about a vertical axis. In this case, the upper surface of the support 114 forms a new workpiece setting surface 18.

Based on the tilt angle αy of the spindle 26 with respect to the Y-direction and the tilt angle αx thereof with respect to the X-direction, the first rotational axis 110a and the second rotational axis 110b are rotated such that the two-axis table 112 is orthogonal to the spindle 26. Thus, the spindle 26 becomes orthogonal to the workpiece setting surface 18 of the two-axis table 112.

As a result, the XY-plane 31 becomes parallel to the workpiece setting surface 18, and when the workpiece 16 is subjected to flattening process on the basis of the XY-plane 31 after coordinate system rotation, a satisfactory flat surface can be formed on the workpiece 16. In addition, since the side surface shape of the workpiece 16 can be machined in a rectangular shape, the machined surface of the workpiece 16 also becomes parallel to the workpiece setting surface 18, and thus the machining quality can be improved.

<Seventh Machine Tool>

Figure 26:
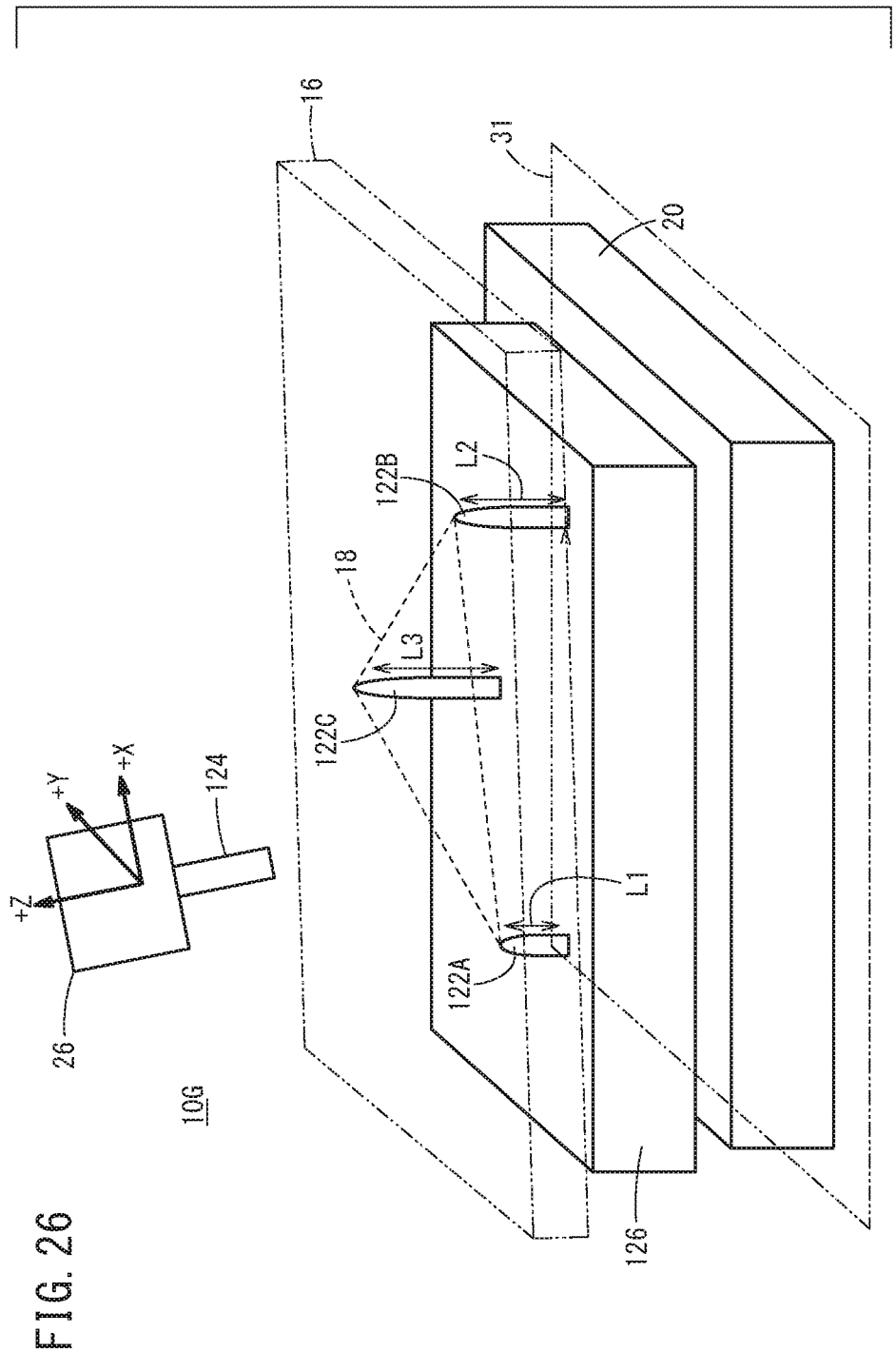
FIG. 26 is a configuration diagram showing a machine tool (seventh machine tool) according to a seventh embodiment of the present invention.
Figure 27A:
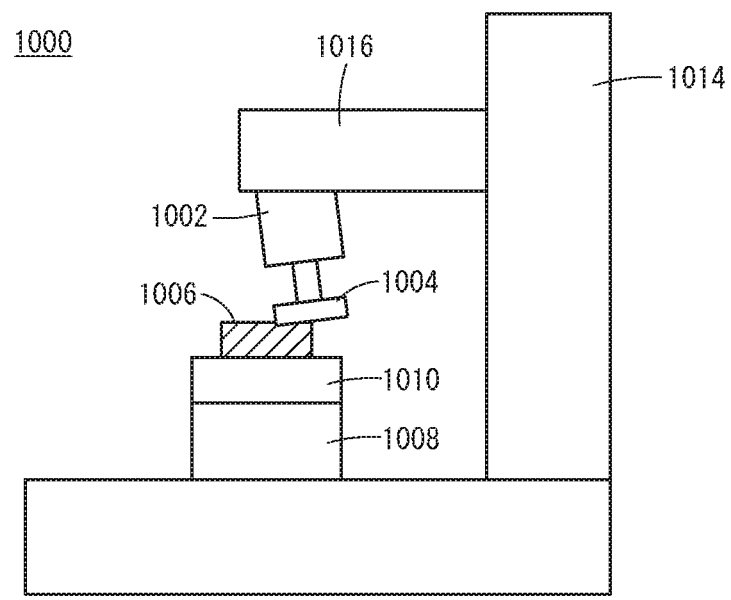
FIG. 27A is a schematic configuration diagram showing a machine tool according to a conventional example.
Figure 27B:
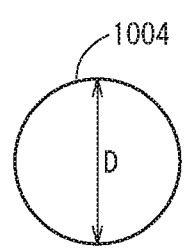
FIG. 27B is an outline drawing showing a milling tool as viewed from the top.
Figure 27C:
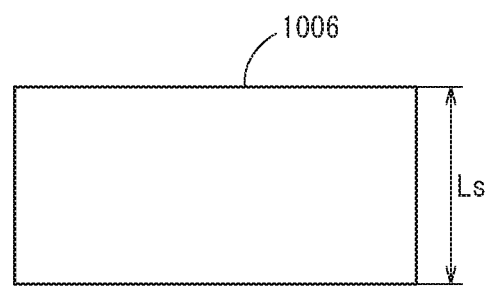
FIG. 27C is an outline drawing of a workpiece as viewed from the top, with its part omitted; and, FIG. 28 is an illustrative view showing a conventional problem (a step being formed on the surface of a workpiece).

Next, a machine tool according to a seventh embodiment (hereinafter referred to as a seventh machine tool 10G) will be described with reference to FIG. 26.

The seventh machine tool 10G also has a means for making the XY-plane 31 and the workpiece setting surface 18 parallel to each other. In this case as well, the workpiece setting surface 18 parallel to the XY-plane 31 is newly set up, instead of setting the workpiece setting surface 18 on the top surface of the table 20. Incidentally, as a means for bringing the XY-plane 31 and the spindle 26 into orthogonal positional relationship, the second machine tool 10B, the fourth machine tool 10D, etc. described above can be adopted.

The seventh machine tool 10G includes a natural clamp jig 120 arranged on the top surface of the table 20 and which holds multiple natural rods (for example, first to third natural rods 122A to 122C) in an advancible and retractable manner, and a reference tool 124 mounted on the spindle 26 for positioning the multiple natural rods.

The natural clamp jig 120 has a base 126 and first to third natural rods 122A to 122C attached so as to advance from and retract into the base 126. These first to third natural rods 122A to 122C are arranged at arbitrary positions on the base 126 so as to define a single plane (workpiece setting surface 18) with their tips.

The natural clamp jig 120 may be of a general type having a configuration as follows.

That is, the first to third natural rods 122A to 122C are each supported and constantly urged upward by a spring. When the reference tool 124 gradually moves down and then the amount of projection of each of the rods becomes equal to a predetermined projection amount, each of the first to third natural rods 122A to 122C is positioned, and is clamped by the hydraulic pressure as a result of pressure rise accompanied by the positioning.

Alternatively, the first to third natural rods 122A to 122C are positioned inside the base 126 at the initial state. When the reference tool 124 has reached the height corresponding to the amount of projection of each rod, the first to third natural rods 122A to 122C are each moved upward by a piston or the like and positioned when the amount of projection becomes equal to a previously specified projection amount, and each rod is clamped by the hydraulic pressure as a result of pressure rise accompanied by the positioning.

Then, based on the tilt angle αy of the spindle 26 in the Y-direction and the tilt angle αx thereof in the X-direction, the amount of projection of each of the first to third natural rods 122A to 122C is determined and positioned such that the workpiece setting surface 18 and the spindle 26 become orthogonal to each other. As a result, the workpiece setting surface 18 and the spindle 26 become orthogonal to each other.

That is, also in the seventh machine tool 10G, the XY-plane 31 and the workpiece setting surface 18 are set parallel to each other, and when the workpiece 16 is flattened on the basis of the XY-plane 31 after coordinate system rotation, it is possible to create a machined surface with a satisfactory flatness in the workpiece 16. In addition, since the shape of the side face of the workpiece 16 can be machined into a rectangular shape, it is possible to make the machined surface of the workpiece 16 parallel to the workpiece setting surface 18, and hence improve the machining quality.

It should be noted that the machine tools and workpiece flattening methods of the present invention are not limited to the above embodiments, and various configurations can be adopted without departing from the scope of the present invention.

What is claimed is:

1. A machine tool comprising:
    a table having a workpiece setting surface to which a workpiece is fixed;
    a spindle equipped with a tool configured to perform flattening on the workpiece fixed to the table;
    a workpiece flattening control unit configured to perform flattening on the workpiece using the tool in a manner that machining areas of the tool on a surface of the workpiece partially overlap one another;
    at least one contact element arranged on the spindle at a position that faces the table;
    a contact-element position storing unit configured to store multiple measured values that are obtained by performing measurement of a position of the contact element at least two times in a state where the spindle is set at at least one phase and the contact element is positioned at an identical point;
    a spindle tilt angle calculating unit configured to calculate a tilt angle of the spindle with respect to an XY-plane for machining, based on the multiple measured values stored in the contact-element position storing unit; and,
    a coordinate system rotation unit configured to rotate the XY-plane about at least one of X-axis and Y-axis, based on the tilt angle of the spindle calculated by the spindle tilt angle calculating unit,
    wherein the workpiece flattening control unit machines a flat surface of the workpiece along the XY-plane rotated by the coordinate system rotation unit.

2. The machine tool according to claim 1, wherein the contact-element position storing unit is configured to store multiple measured values that are obtained by performing measurement on one of the contact elements in a state where the spindle is set at two or more different phases and the one contact element is positioned at an identical point.

3. The machine tool according to claim 1, wherein:
    the spindle has the multiple contact elements arranged thereon;
    the contact-element position storing unit is configured to store multiple measured values that are obtained by measuring the position of each of the multiple contact elements in a state where the spindle is set at one phase and each of the multiple contact elements is positioned at an identical point; and the spindle tilt angle calculating unit determines a tilt angle of the spindle with respect to at least one direction of the XY-plane, based on the multiple measured values.

4. The machine tool according to claim 1, wherein:
the contact element is a tip arranged on the tool at a position that faces the table; and
the contact-element position storing unit is configured to store multiple measured values that are obtained by performing measurement of a position of a cutting edge of the tip at least two times by use of a cutting edge position measuring unit fixed on the table, in a state where the cutting edge of the tip is positioned.

5. The machine tool according to claim 4, wherein a tool length measuring device configured to measure a length of the tool is used as the cutting edge position measuring unit.

6. The machine tool according to claim 1, wherein:
the contact element is a probe element of a touch probe mounted on the spindle at a position facing the table; and
the probe element is deviated from a center axis of the spindle toward X-direction or Y-direction of the table.

7. The machine tool according to claim 1, further comprising rotational axes configured to rotate the workpiece setting surface so as to make the XY-plane rotated by the coordinate system rotation unit and the workpiece setting surface parallel to each other.

8. The machine tool according to claim 1, further comprising a natural clamp jig configured to position the workpiece setting surface so as to make the XY-plane rotated by the coordinate system rotation unit and the workpiece setting surface parallel to each other.

9. The machine tool according to claim 1, wherein a diameter of the tool is smaller than a shorter-side dimension of the workpiece.

10. A workpiece flattening method for, in flattening a workpiece by use of: a table having a workpiece setting surface to which the workpiece is fixed; a spindle equipped with a tool configured to perform flattening on the workpiece fixed to the table; and the tool, performing machining in a manner that machining areas of the tool on a surface of the workpiece partially overlap one another, comprising:
a measured-value storing step of storing multiple measured values that are obtained by performing at least two times of measurement of a position of at least one contact element arranged on the spindle at a position that faces the table, in a state where the spindle is set at at least one phase and the contact element is positioned at an identical point;
a spindle tilt angle calculating step of calculating a tilt angle of the spindle with respect to an XY-plane for machining, based on the multiple measured values stored; and
a coordinate system rotating step of rotating the XY-plane about at least one of X-axis and Y-axis, based on the tilt angle of the spindle calculated,
wherein a flat surface of the workpiece is machined along the XY-plane rotated by the coordinate system rotating step.

11. The workpiece flattening method according to claim 10, wherein in the measured-value storing step, multiple measured values are stored that are obtained by performing measurement on one of the contact elements in a state where the spindle is set at two or more different phases and the one contact element is positioned at an identical point.

12. The workpiece flattening method according to claim 10, wherein:
the spindle has the multiple contact elements arranged thereon;
in the measured-value storing step, multiple measured values are stored that are obtained by measuring the position of each of the multiple contact elements in a state where the spindle is set at one phase and each of the multiple contact elements is positioned at an identical point; and
in the spindle tilt angle calculating step, a tilt angle of the spindle with respect to at least one direction of the XY-plane is determined, based on the multiple measured values.

13. The workpiece flattening method according to claim 10, wherein:
the contact element is a tip arranged on the tool at a position that faces the table; and
in the measured-value storing step, multiple measured values are stored that are obtained by performing measurement of a position of a cutting edge of the tip at least two times by use of a cutting edge position measuring unit fixed on the table, in a state where the cutting edge of the tip is positioned.

14. The workpiece flattening method according to claim 10, wherein:
the contact element is a probe element of a touch probe mounted on the spindle at a position facing the table; and
the probe element is deviated from a center axis of the spindle toward X-direction or Y-direction of the table.

15. The workpiece flattening method according to claim 10, wherein a diameter of the tool is smaller than a shorter-side dimension of the workpiece.

* * * * *